（12) United States Patent
Park et al.

(10) Patent No.: US 12,197,255 B2
(45) Date of Patent: Jan. 14, 2025

(54) ELASTIC MEMBER

(71) Applicant: LG INNOTEK CO., LTD., Seoul (KR)

(72) Inventors: Duck Hoon Park, Seoul (KR); Sung Won Kang, Seoul (KR); Jung Min Gwak, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 225 days.

(21) Appl. No.: 17/785,231

(22) PCT Filed: Dec. 16, 2020

(86) PCT No.: PCT/KR2020/018433
§ 371 (c)(1),
(2) Date: Jun. 14, 2022

(87) PCT Pub. No.: WO2021/137478
PCT Pub. Date: Jul. 8, 2021

(65) Prior Publication Data
US 2023/0018777 A1  Jan. 19, 2023

(30) Foreign Application Priority Data
Dec. 30, 2019 (KR) .................. 10-2019-0177859

(51) Int. Cl.
*G06F 1/16*   (2006.01)
(52) U.S. Cl.
CPC .......... *G06F 1/1656* (2013.01); *G06F 1/1616* (2013.01); *G06F 1/1643* (2013.01); *G06F 1/1652* (2013.01)
(58) Field of Classification Search
CPC .................................................. G06F 1/1652
See application file for complete search history.

(56) References Cited

U.S. PATENT DOCUMENTS 9,983,424 B2 * 5/2018 Kim ................. H10K 77/111
10,056,443 B2 * 8/2018 Shyu ................ H10K 59/123
(Continued)

FOREIGN PATENT DOCUMENTS

CN         205881905        1/2017
KR      10-2016-0144912    12/2016
(Continued)

OTHER PUBLICATIONS

Chinese Office Action dated May 31, 2023 issued in Application No. 202080091326.3.
(Continued)

*Primary Examiner* — Lisa Lea-Edmonds
(74) *Attorney, Agent, or Firm* — KED & ASSOCIATES, LLP

(57) ABSTRACT

A resilient member according to an embodiment comprises one surface and the other surface opposite from the one surface. In a resilient member comprising a first area and a second area, the first area is defined as a folding area, and the second area is defined as a non-folding area. A plurality of first patterns are formed on the first area, and a plurality of second patterns are formed on the second area. The first patterns or the second patterns are formed by holes or grooves. The surface area of second openings, which are formed by the holes or grooves of the second patterns on the one surface or the other surface, differ from one another within the second area.

20 Claims, 15 Drawing Sheets

(56) References Cited

U.S. PATENT DOCUMENTS

| | | | |
|---|---|---|---|
| 10,164,208 B2* | 12/2018 | Lee | B32B 3/30 |
| 10,170,505 B2 | 1/2019 | Lee et al. | |
| 10,490,771 B2* | 11/2019 | Kim | H10K 50/844 |
| 10,665,823 B2 | 5/2020 | Kim et al. | |
| 11,502,152 B2* | 11/2022 | Zhu | H10K 59/131 |
| 11,513,560 B2* | 11/2022 | Dong | B32B 9/04 |
| 11,877,466 B2* | 1/2024 | Kang | B32B 15/18 |
| 2016/0357052 A1 | 12/2016 | Kim et al. | |
| 2018/0190936 A1* | 7/2018 | Lee | B32B 3/30 |
| 2019/0036068 A1* | 1/2019 | Kim | G06F 1/1601 |
| 2019/0207141 A1* | 7/2019 | Kim | H10K 50/841 |
| 2021/0352814 A1* | 11/2021 | Park | B32B 3/266 |
| 2022/0050321 A1* | 2/2022 | Park | H05K 1/118 |
| 2022/0206537 A1* | 6/2022 | Park | G06F 3/044 |
| 2022/0217840 A1* | 7/2022 | Park | G06F 3/0412 |
| 2022/0223074 A1* | 7/2022 | Park | H10K 77/00 |
| 2022/0293870 A1* | 9/2022 | Park | H10K 77/111 |
| 2022/0399521 A1* | 12/2022 | Kang | B32B 3/30 |
| 2023/0018777 A1* | 1/2023 | Park | G06F 1/1652 |
| 2023/0266796 A1* | 8/2023 | Wu | G06F 3/0412 |
| | | | 345/174 |

FOREIGN PATENT DOCUMENTS

| | | |
|---|---|---|
| KR | 10-2017-0137260 | 12/2017 |
| KR | 10-2018-0040766 | 4/2018 |
| KR | 10-2019-0080740 | 7/2019 |
| TW | 201824534 | 7/2018 |

OTHER PUBLICATIONS

International Search Report dated Mar. 29, 2021 issued in Application No. PCT/KR2020/018433.

* cited by examiner

[FIG. 1]
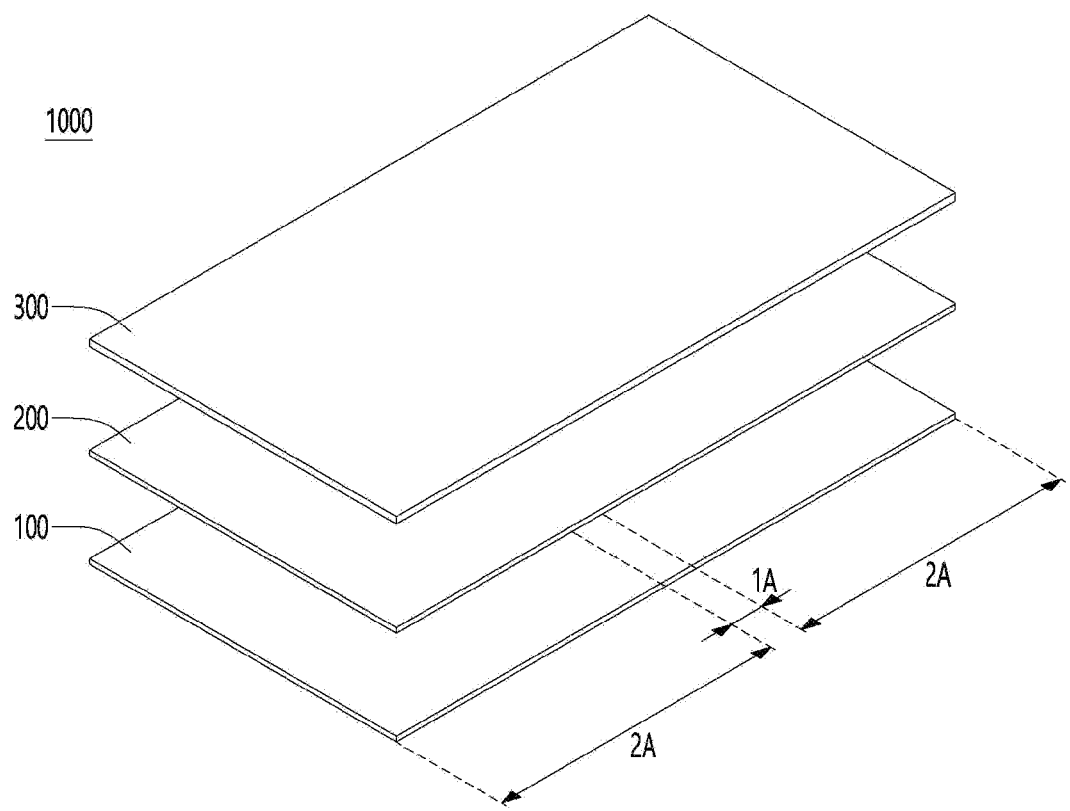

[FIG. 2]
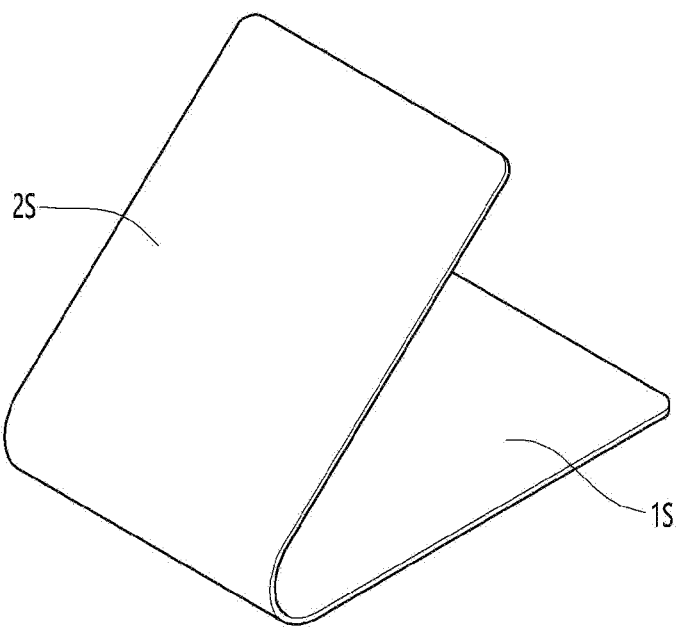
[FIG. 3]
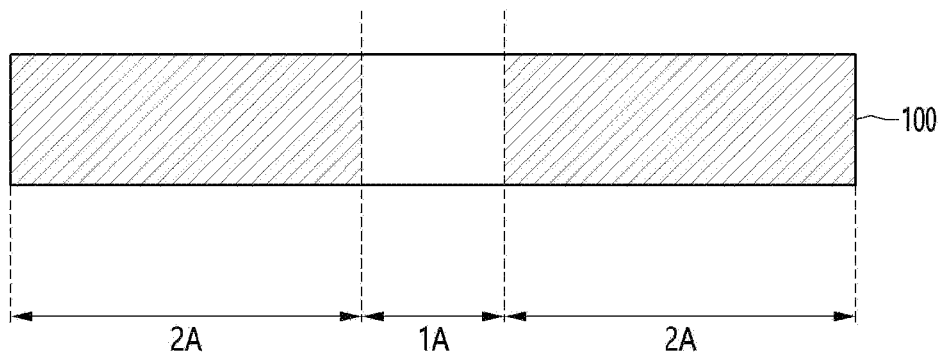

[FIG. 4]
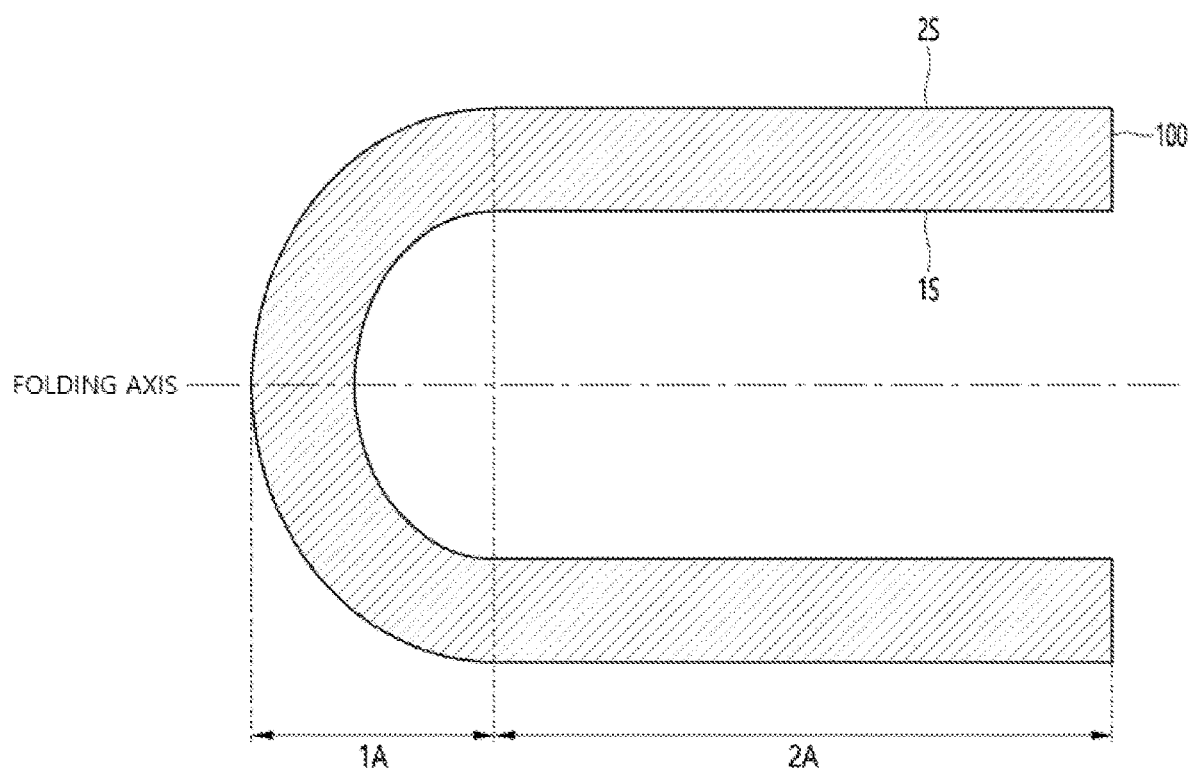

[FIG. 5]
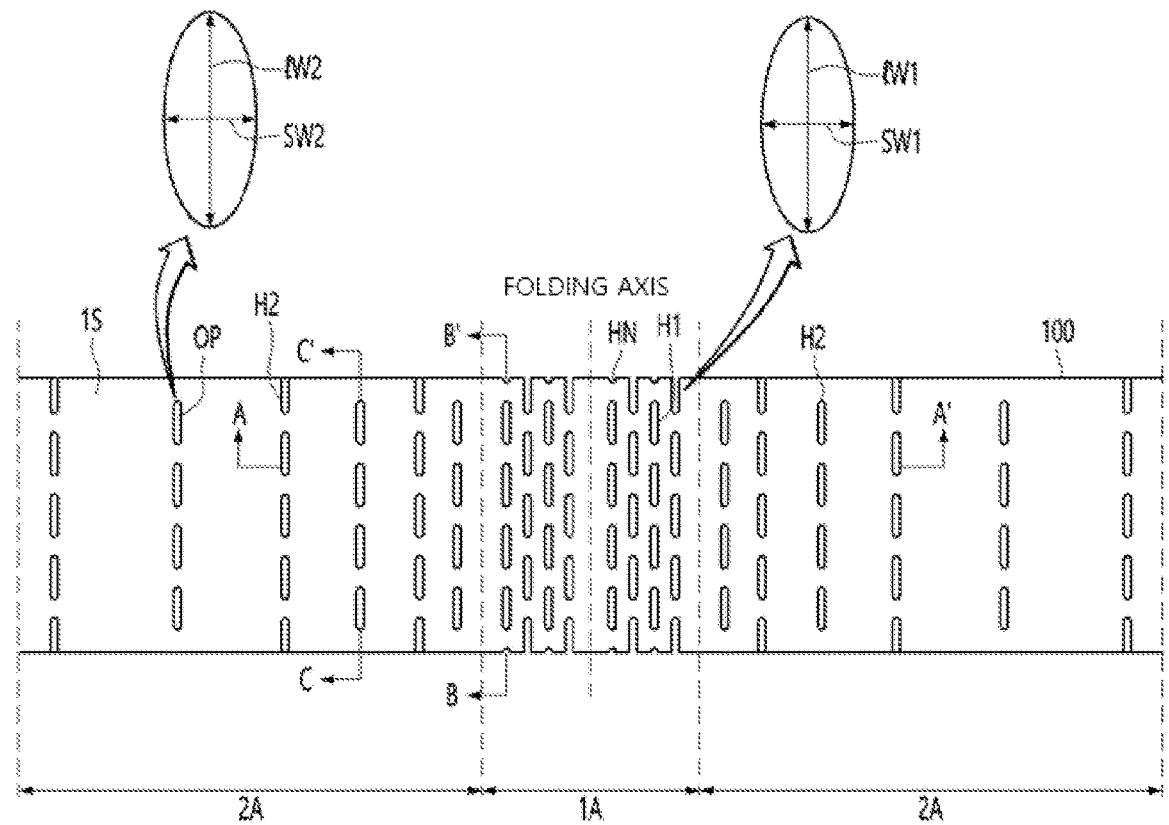
[FIG. 6]
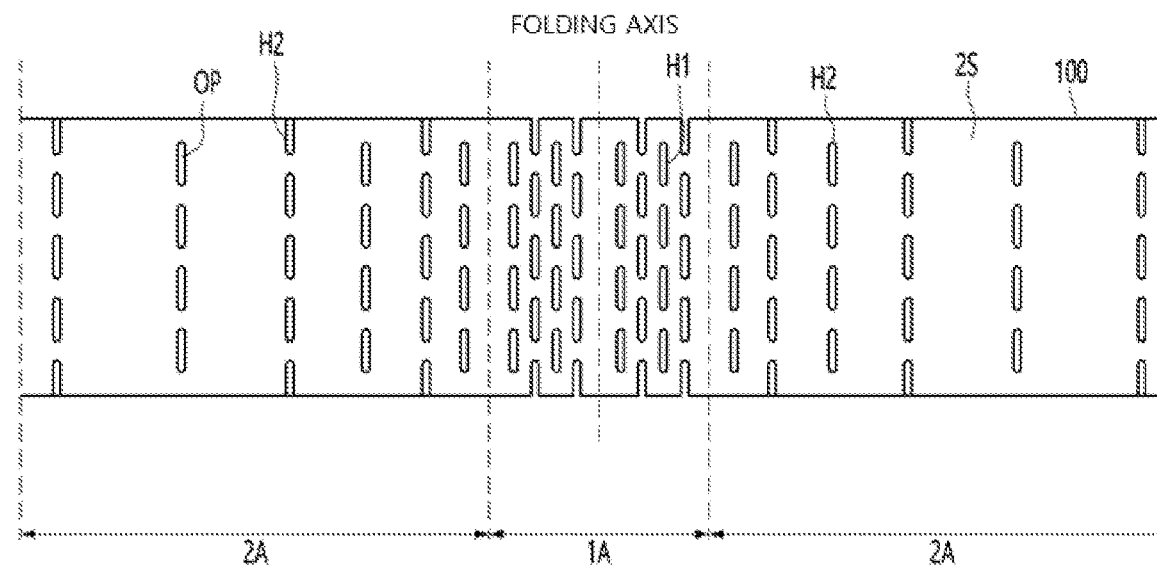

[FIG. 7]
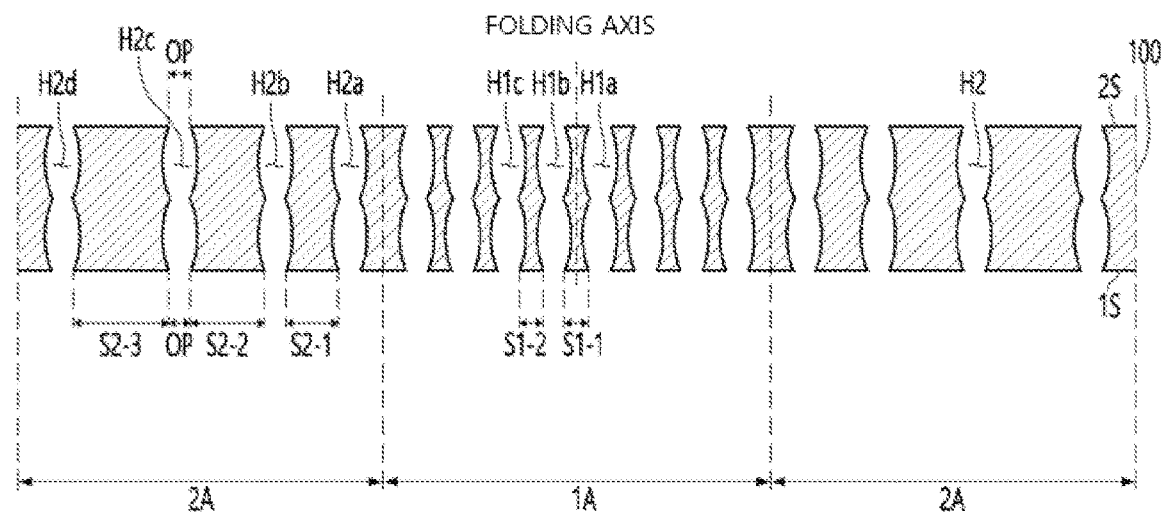
[FIG. 8]
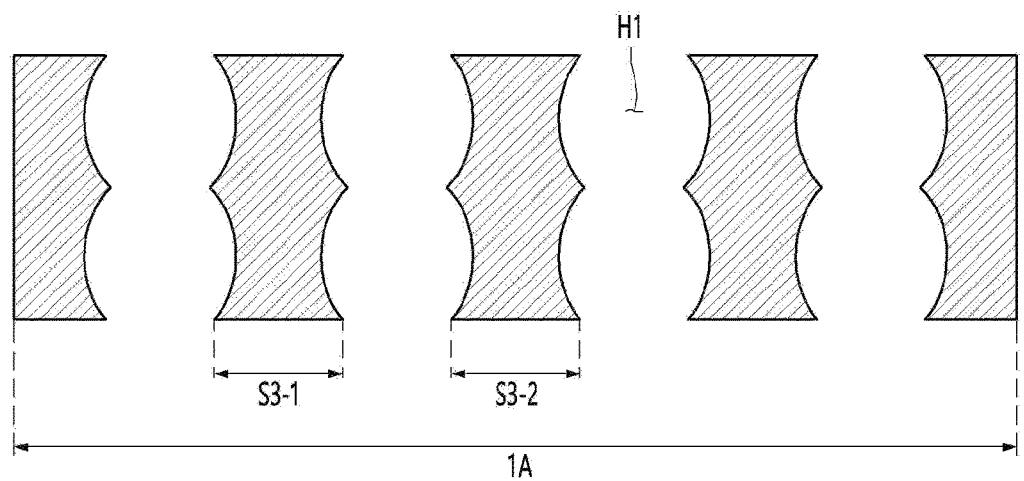

[FIG. 9]
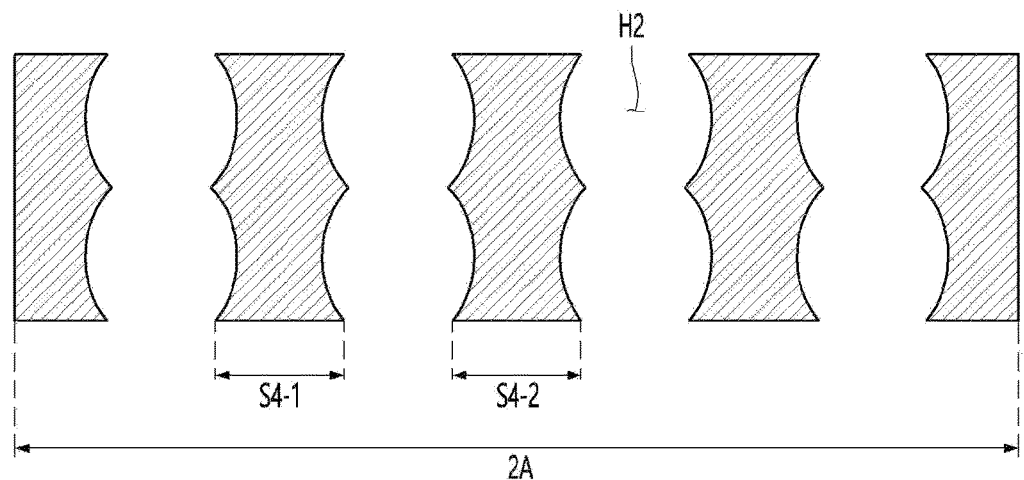
[FIG. 10]
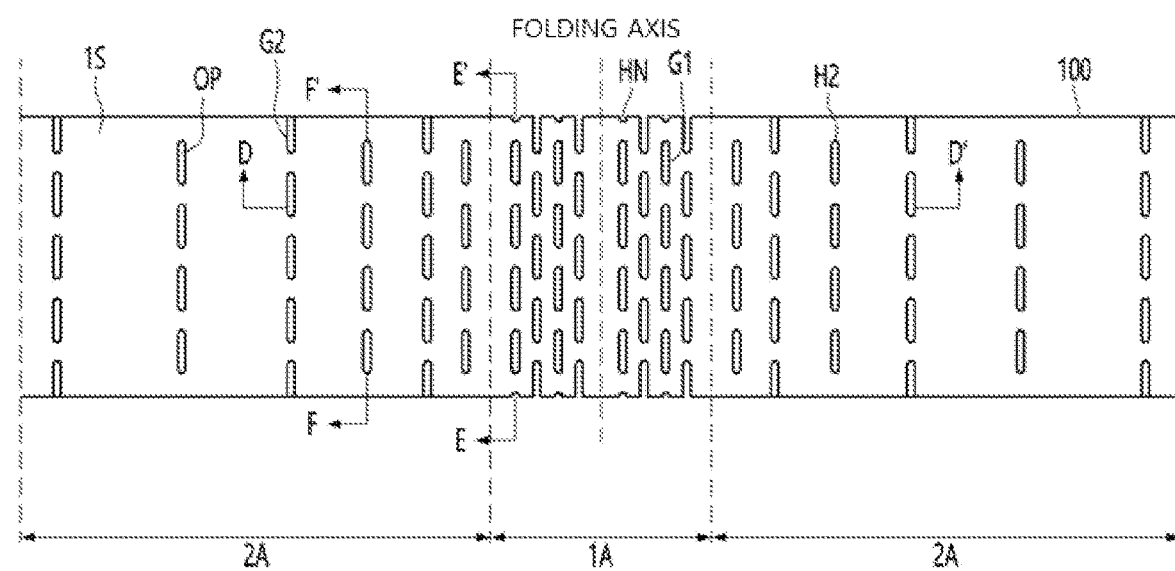

[FIG. 11]
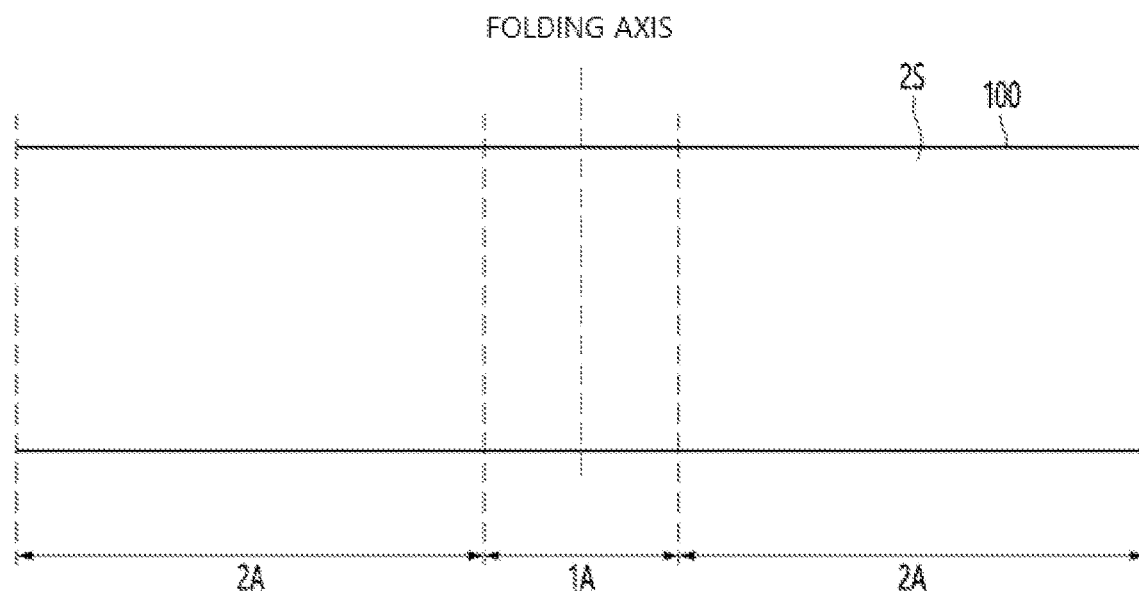
[FIG. 12]
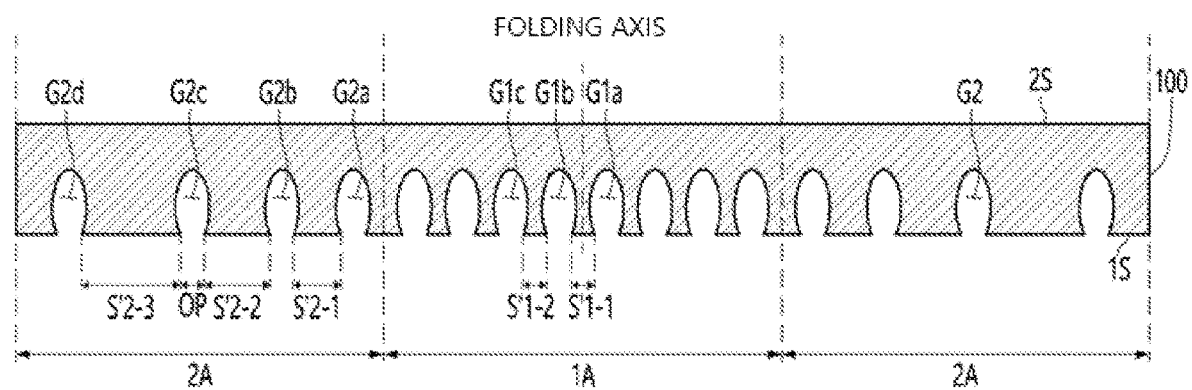

【FIG. 13】
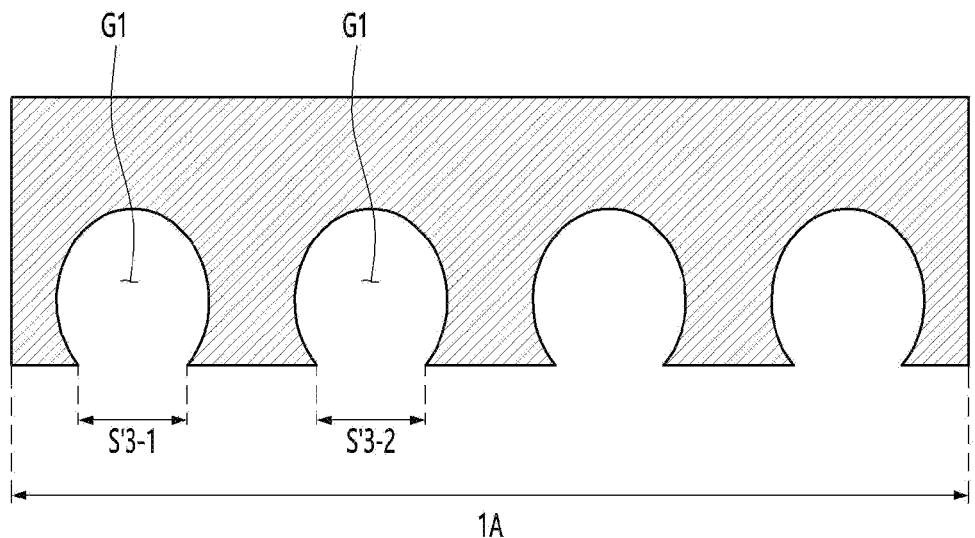
【FIG. 14】
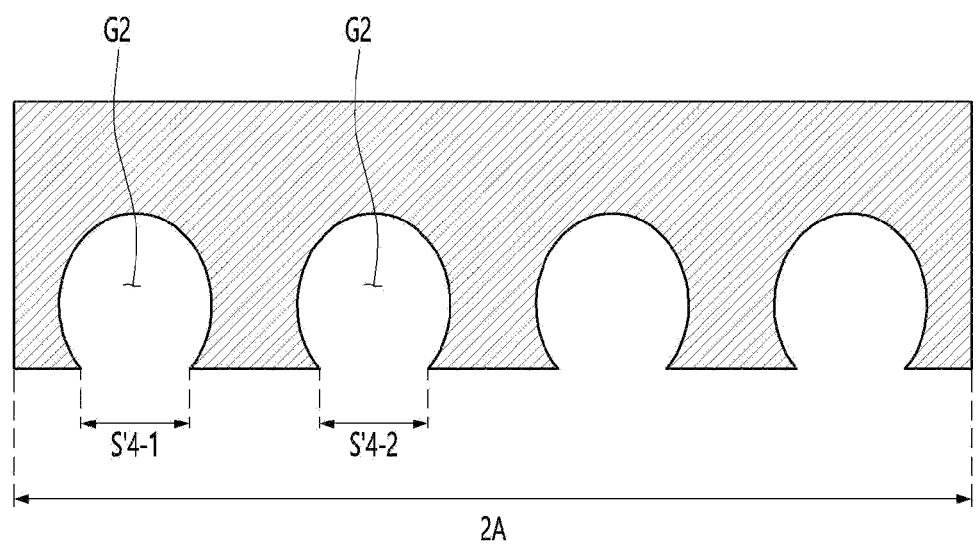

【FIG. 15】
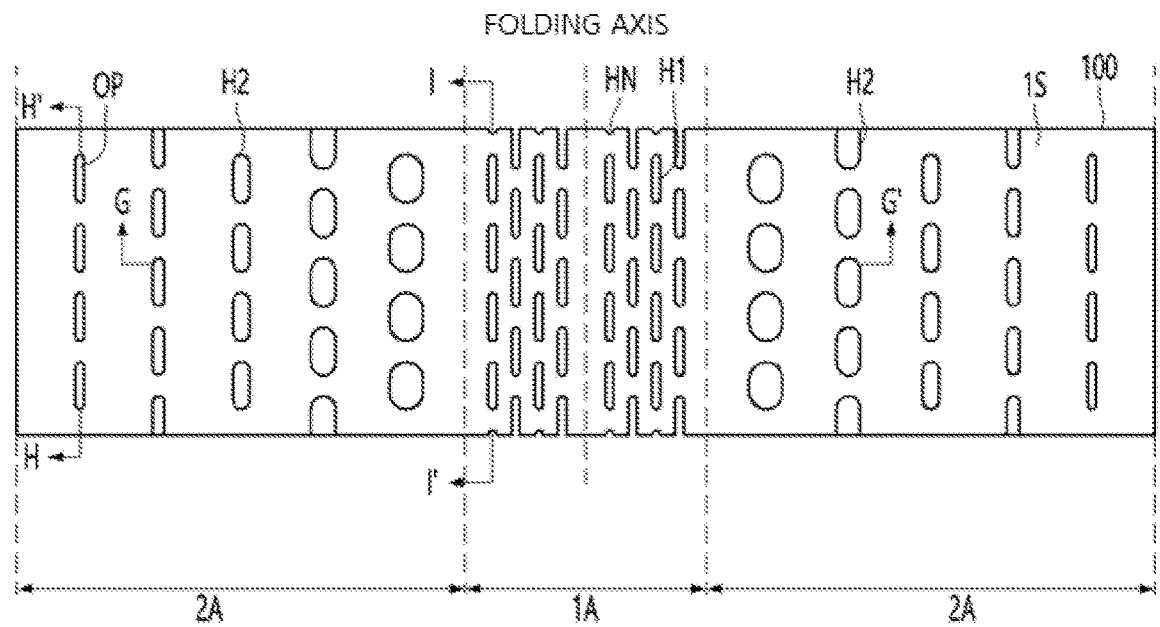
【FIG. 16】
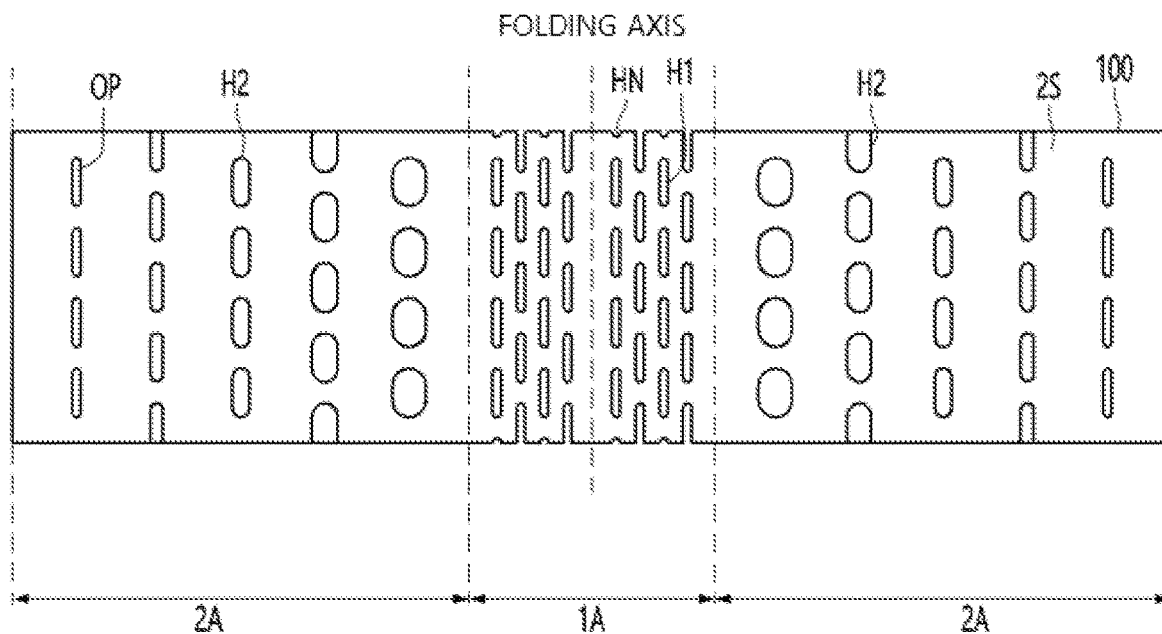

【FIG. 17】
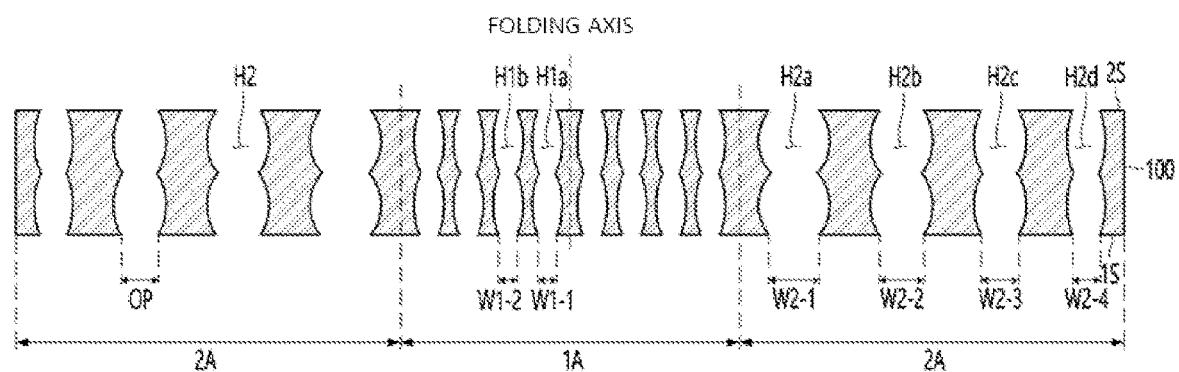
【FIG. 18】
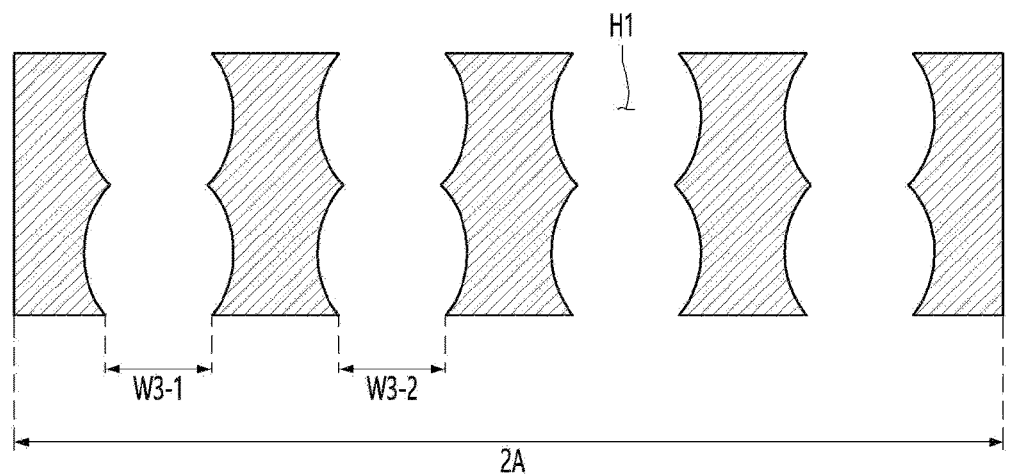

[FIG. 19]
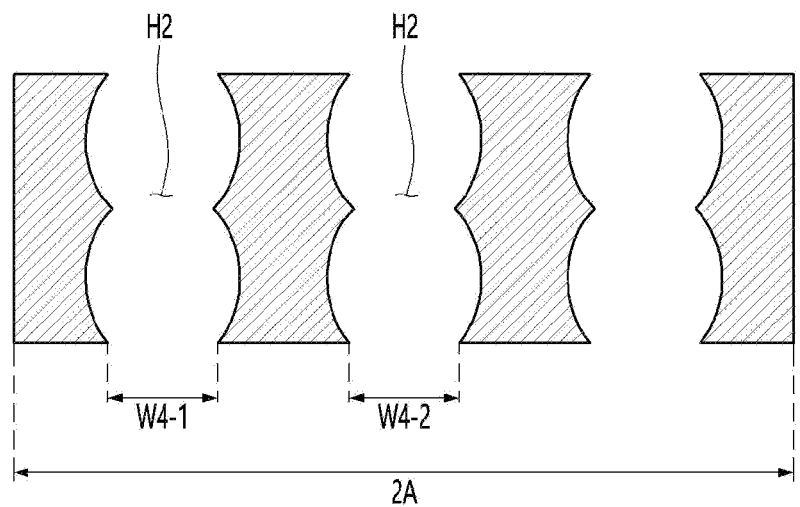
[FIG. 20]
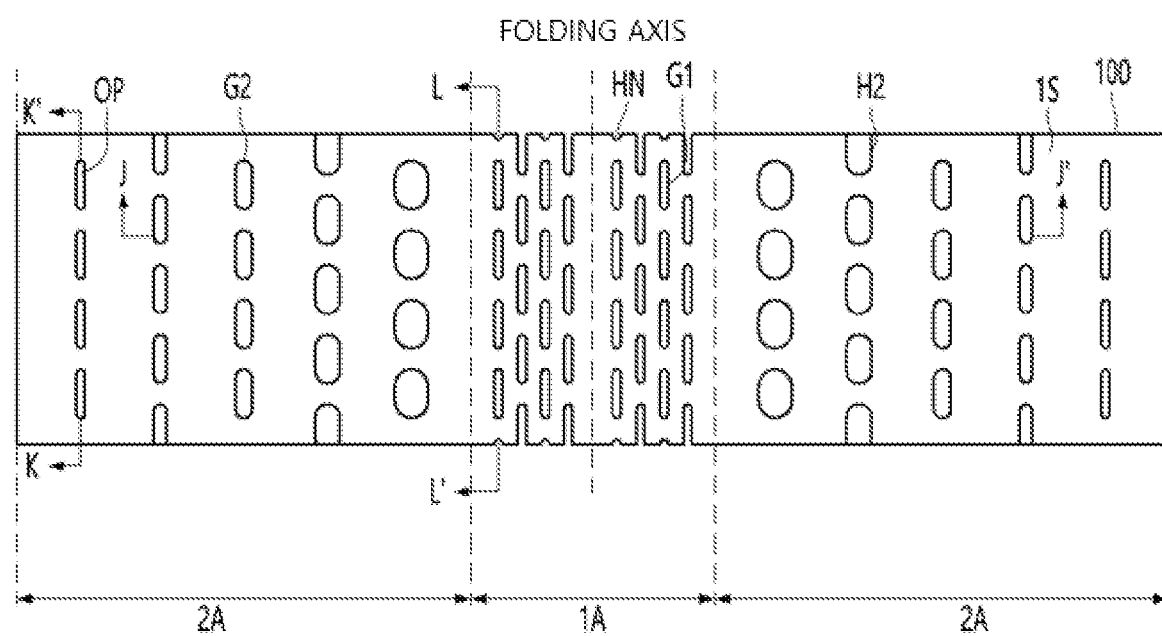

【FIG. 21】
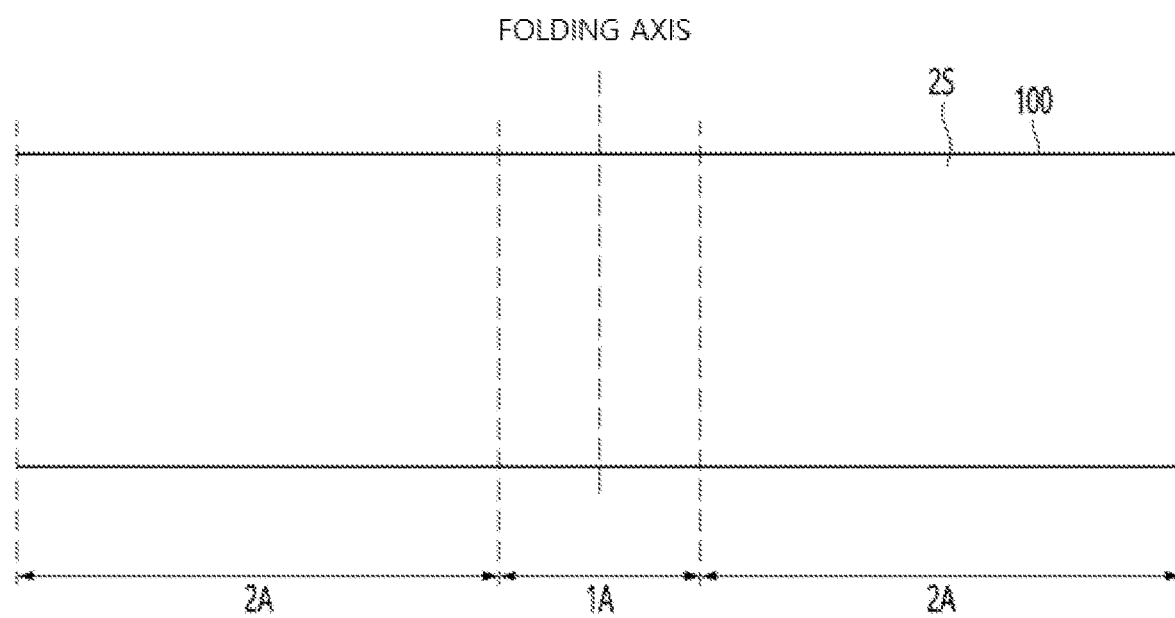
【FIG. 22】
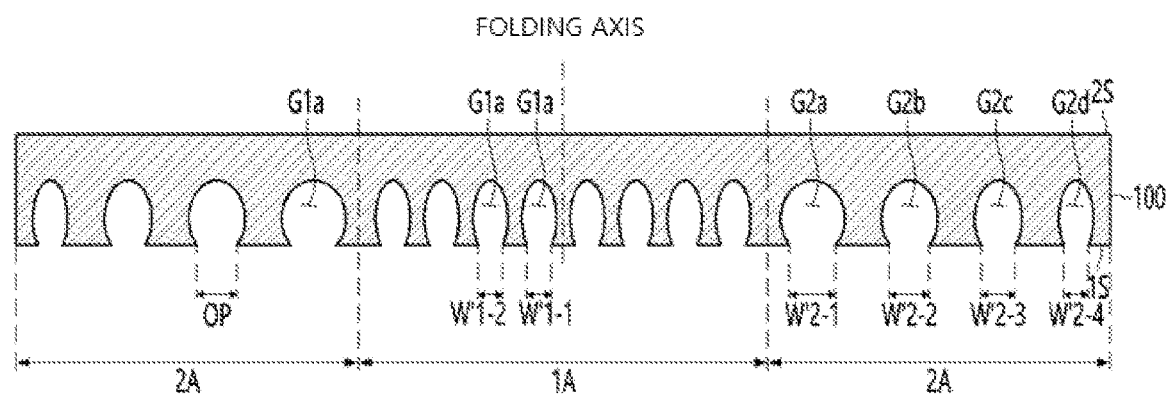

【FIG. 23】
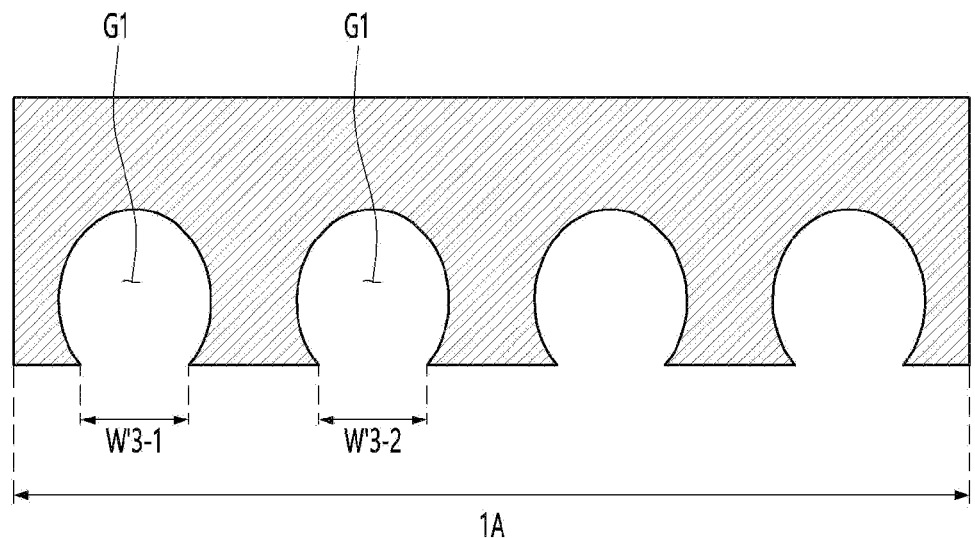
【FIG. 24】
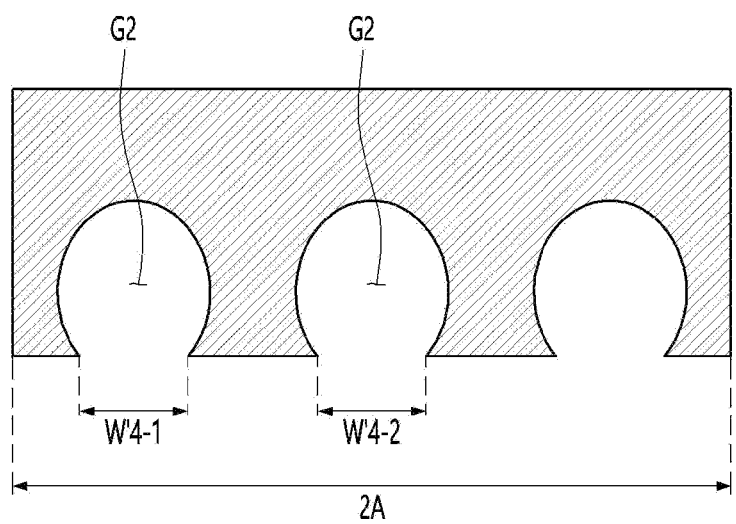

[FIG. 25]
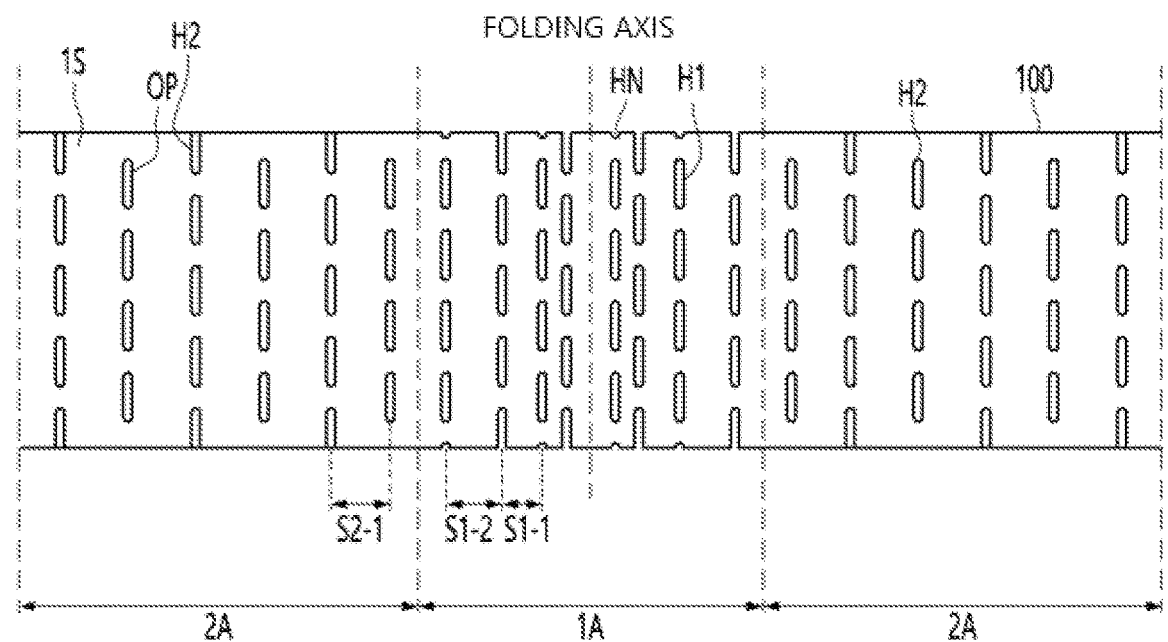
[FIG. 26]
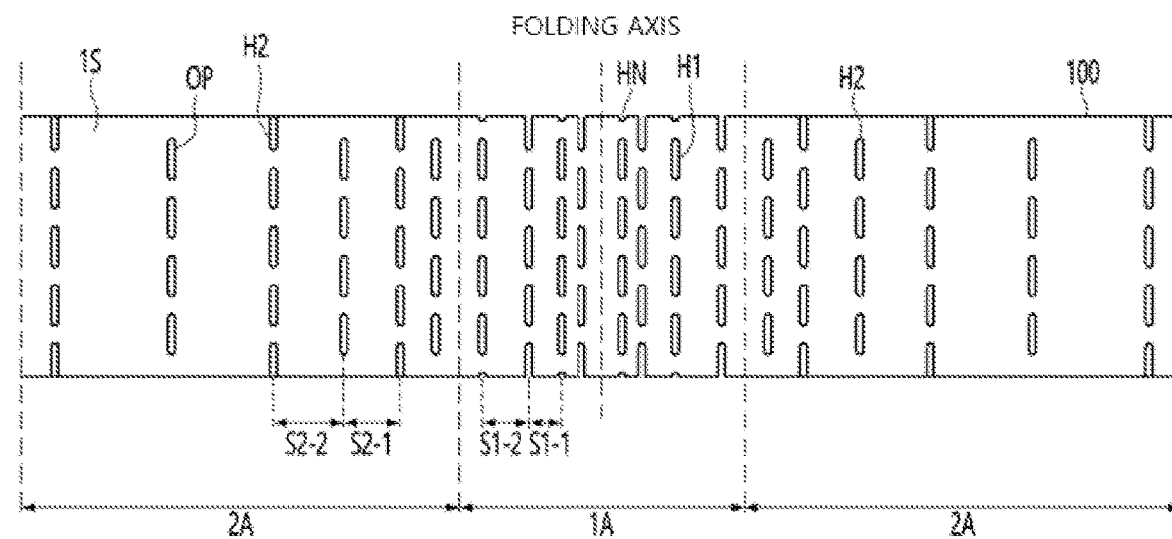

【FIG. 27】
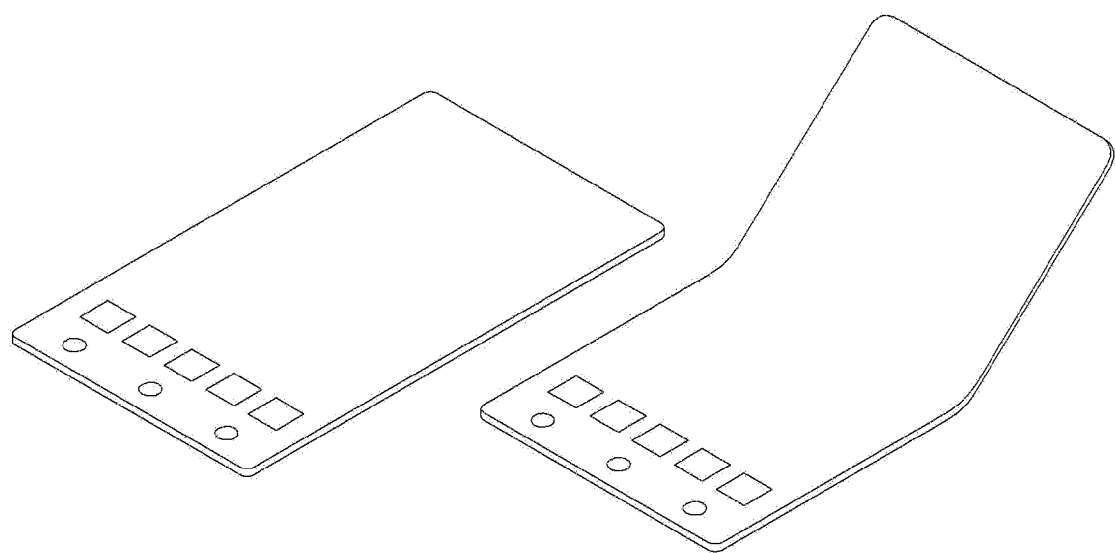

ELASTIC MEMBER

CROSS-REFERENCE TO RELATED PATENT APPLICATIONS

This application is a U.S. National Stage Application under 35 U.S.C. § 371 of PCT Application No. PCT/KR2020/018433, filed Dec. 16, 2020, which claims priority to Korean Patent Application No. 10-2019-0177859, filed Dec. 30, 2019, whose entire disclosures are hereby incorporated by reference.

TECHNICAL FIELD

An embodiment relates to an elastic member.

BACKGROUND ART

Recently, there is an increasing demand for a flexible or foldable display device capable of easily carrying various applications and displaying an image on a large screen when being carried.

Such a flexible or foldable display device is folded or partially bent when being carried or stored, and may be implemented with the display unfolded when displaying images. Accordingly, an image display area may be increased, and a user may easily carry the display.

After the flexible or foldable display device is folded or bent, a restoration process of unfolding the flexible display device again may be repeated.

That is, since the flexible or foldable display device repeats folding and unfolding operations, the substrate of the flexible display device is required to have a certain strength and elasticity, and cracks and deformations should not occur in the substrate during folding and restoring.

Meanwhile, the substrate for display which is elastic member constituting a flexible or foldable display device generally uses a metal substrate.

Accordingly, the substrate for display including the metal may be subjected to compressive and tensile stresses in the folding region as folding and unfolding are repeated, and thus, cracks may occur in the folding region, thereby reducing reliability.

Accordingly, it is possible to prevent such cracks by forming patterns such as grooves or holes for dispersing stress in a substrate for display Meanwhile, when the pattern is formed only in the folding area of the substrate for display, a density difference and stress non-uniformity may occur in the area where the pattern is formed and the area where the pattern is not formed. As a result, overall warpage occurs in the substrate for display, and the pattern can be visually recognized.

Accordingly, there is a need for a substrate for a display having a new structure that can secure the reliability of the substrate for a display and has improved folding characteristics.

DISCLOSURE

Technical Problem

An embodiment is to provide an elastic member having improved reliability and folding characteristics.

Technical Solution

An elastic member according to an embodiment includes one surface and the other surface opposite to the one surface, and includes a first area and a second area, and the first area is defined as a folding area, and the second area is defined as an unfolding area, and a plurality of first patterns are formed in the first region, and a plurality of second patterns are formed in the second region, and the first patterns or the second patterns are formed as holes or grooves, and a second opening area on the one surface or the other surface formed by the holes or grooves of the second patterns is different from each other in the second region.

Advantageous Effects

The elastic member according to the embodiment may control the size, area, and spacing of the hole or groove disposed in the unfolding area.

The elastic member according to the embodiment may control the area of a hole or groove disposed in the unfolding area to secure a supporting force in the unfolding area of the elastic member, thereby maintaining the strength of the elastic member.

In addition, the elastic member according to the embodiment controls the spacing and size of the holes or grooves disposed in the unfolding area. Accordingly, it is possible to prevent the boundary region between the unfolding region and the folding region of the elastic member from being visually recognized from the outside due to the difference in the opening areas of the first and second regions. In addition, it is possible to prevent warpage from occurring in the boundary region.

That is, in the elastic member according to the embodiment, the gap between the holes or grooves disposed in the unfolding area increases as the distance from the folding area increases, or the size of the hole or groove decreases as the distance from the folding area increases. Accordingly, the density of the holes or grooves disposed in the unfolding area, ie, the opening area, is controlled to be smaller as the distance from the folding area increases. Accordingly, it is possible to prevent the boundary region between the unfolding region and the folding region of the elastic member from being visually recognized from the outside, and it is possible to prevent a sudden change in stress from being bent in the boundary region.

Accordingly, the elastic member according to the embodiment may have improved folding characteristics, visibility, and reliability.

DESCRIPTION OF DRAWINGS

FIG. 1 is a perspective view of a flexible display device according to an embodiment.

FIG. 2 is a perspective view of an elastic member according to an embodiment.

FIG. 3 is a side view of the elastic member before folding according to an embodiment.

FIG. 4 is a side view of the elastic member after folding according to an embodiment.

FIG. 5 is a top view of one surface of the elastic member according to the first embodiment.

FIG. 6 is a top view of the other surface of the elastic member according to the first embodiment.

FIG. 7 is view showing a cross-sectional view taken along line A-A' of FIG. 5.

FIG. 8 is view showing a cross-sectional view taken along line B-B' of FIG. 5.

FIG. 9 is view showing a cross-sectional view taken along line C-C' of FIG. 5.

FIG. 10 is a top view of one surface of the elastic member according to the second embodiment.

FIG. 11 is a top view of the other surface of the elastic member according to the second embodiment.

FIG. 12 is view showing a cross-sectional view taken along line D-D' of FIG. 10.

FIG. 13 is view showing a cross-sectional view taken along line E-E' of FIG. 10.

FIG. 14 is view showing a cross-sectional view taken along line F-F' of FIG. 10.

FIG. 15 is a top view of one surface of the elastic member according to the third embodiment.

FIG. 16 is a top view of the other surface of the elastic member according to the third embodiment.

FIG. 17 is view showing a cross-sectional view taken along line G-G' of FIG. 15.

FIG. 18 is view showing a cross-sectional view taken along line H-H' of FIG. 15.

FIG. 19 is view showing a cross-sectional view taken along line I-I' of FIG. 15.

FIG. 20 is a top view of one surface of the elastic member according to the fourth embodiment.

FIG. 21 is a top view of the other surface of the elastic member according to the fourth embodiment.

FIG. 22 is view showing a cross-sectional view taken along line J-J' of FIG. 20.

FIG. 23 is view showing a cross-sectional view taken along line K-K' of FIG. 20.

FIG. 24 is view showing a cross-sectional view taken along line L-L' of FIG. 20.

FIGS. 25 and 26 are views showing a top view of one surface of the elastic member according to the fifth embodiment.

FIG. 27 is a view for describing an example in which the elastic member according to an embodiment is applied.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an elastic member according to an embodiment will be described with reference to drawings.

FIG. 1 is perspective views of a flexible or foldable display device according to an embodiment.

Referring to FIG. 1, a flexible or foldable display device 1000 according to an embodiment may include an elastic member 100, a display panel 200 disposed on the elastic member 100, and a touch panel 300 disposed on the display panel 200.

The elastic member 100 may support the display panel 200 and the touch panel 300. That is, the elastic member 100 may be a support substrate supporting the display panel 200 and the touch panel 300.

The elastic member 100 may include a material such as metal. For example, the elastic member 100 may include metal, metal alloy, plastic, a composite material (e.g., carbon fiber reinforced plastic, a magnetic or conductive material, a glass fiber reinforced material, etc.), ceramic, sapphire, glass, and the like.

The elastic member 100 may be flexible or foldable. That is, the elastic member 100 may be folded or bent in one direction. That is, the elastic member 100 may be a substrate for display applied to a flexible display device or a foldable display device.

The elastic member 100 may include at least two areas. In detail, the elastic member 100 may include a first area 1A and a second area 2A.

The first area 1A may be defined as an area where the elastic member 100 is folded. That is, the first area 1A may be a folding area.

In addition, the second area 2A may be defined as an area where the elastic member 100 is not folded. That is, the second area 2A may be an unfolding area.

The first area 1A and the second area 2A will be described in detail below.

The display panel 200 may be disposed above the elastic member 100.

The display panel 200 may include a plurality of pixels including a switching thin film transistor, a driving thin film transistor, a power storage device, and an organic light-emitting diode (OLED). In case of the OLED, deposition may be performed at a relatively low temperature, and the OLED may be mainly applied to a flexible display device for reasons such as low power and high luminance. Here, a pixel refers to a minimum unit for displaying an image, and the display panel displays an image through a plurality of pixels.

The display panel may include a substrate, a gate line disposed on the substrate, a data line crossing with the gate line in isolation, and a common power line. In general, one pixel may be defined by the gate line, the data line, and the common power line as a boundary.

The substrate may include a material having flexible properties such as a plastic film, and the display panel 200 may be implemented by disposing an organic light-emitting diode and a pixel circuit on a flexible film.

The touch panel 300 may be disposed above the display panel 200. The touch panel 300 may implement a touch function in the flexible display device, and the touch panel may be omitted in the foldable display device that simply displays an image without the touch function.

The touch panel 300 may include a substrate and a touch electrode disposed on the substrate. The touch electrode may sense a position of an input device that is touched on the flexible display device using a capacitance type or a resistive film type.

The substrate of the touch panel 300 may include a material having flexible properties such as a plastic film, and the touch panel 300 may be implemented by disposing the touch electrode on the flexible film.

Meanwhile, the elastic member 100 and the display panel 200 may have different sizes.

For example, the area of the elastic member 100 may be 90% or more to 110% or less of the area of the display panel 200. In detail, the area of the elastic member 100 may be 95% or more to 105% or less of the area of the display panel 200. In more detail, the area of the elastic member 100 may be 97% or more to 100% or less of the area of the display panel 200.

When the area of the elastic member 100 is 90% or less of the area of the display panel 200, the supporting force of the elastic member 100 to support the display panel 200 or the touch panel 300 may be reduced. Accordingly, a curl may occur in the unfolding area of the elastic member 100. Accordingly, when the user visually recognizes the screen area, visibility may decrease. Also, when the touch is driven, a touch malfunction may occur because the screen of the touch area is incomplete due to the curl area.

An addition, when the area of the elastic member 100 increases to 110% or more of the area of the display panel 200, a supporting force for supporting the display panel or the touch panel by the elastic member 100 may be secured. However, a bezel area of a display device including the substrate, the display panel, and the touch panel may increase. As a result, the screen area effective to the user is narrowed, which may be inconvenient when using the display device.

In addition, the area of the first region 1A of the elastic member 100 may be 1% or more to 30% or less of the total area of the elastic member 100. In detail, the area of the first region 1A of the elastic member 100 may be 5% or more to 20% or less of the total area of the elastic member 100. An area of the first region 1A of the elastic member 100 may be 10% or more to 15% or less of the total area of the elastic member 100.

When the area of the first region 1A of the elastic member 100 is 1% or less of the total area of the elastic member 100, when folding and restoring the elastic member is repeated, cracks may occur at the boundary of the folding area and the unfolding area. Accordingly, folding reliability of the elastic member 100 may be reduced.

In addition, when the area of the first region 1A of the elastic member 100 exceeds 30% of the total area of the elastic member 100, when the elastic member is folded, curl may occur in the folding area in the display panel 200. Accordingly, when the user visually recognizes the screen area, visibility may decrease. Also, when the touch is driven, a touch malfunction may occur because the screen of the touch area is incomplete due to the curl area Meanwhile, although not shown in the drawings, a cover window for protecting the flexible display device may be additionally disposed on the touch panel 300 or on the display panel 200 (when the touch panel is omitted).

Meanwhile, the elastic member 100, the display panel 200, and the touch panel 300 may be adhered to each other through an adhesive layer or the like. In this case, when the elastic member 100 and the display panel 200 are attached to each other, the adhesive layer is not disposed in the first area of the elastic member 100, that is, in the folding area, and the adhesive layer may be disposed only in the second region, that is, in the unfolding region, to be adhered to each other. Alternatively, the adhesive layer may be disposed on both the first region and the second region.

As described above, the flexible display device includes the elastic member 100.

Referring to FIG. 2, the elastic member 100 may be bent in one direction.

In detail, the elastic member 100 may include one surface 1S and the other surface 2S opposite to the one surface 1S. In the elastic member 100, the one surface 1S or the other surface 2S may be bent to face each other. That is, a surface on which the panels are disposed may be bent to face each other, or a surface opposite to a surface on which the patterns are disposed may be bent to face each other.

In the following description, as shown in FIG. 2, it will be mainly described that the one surfaces 1S are bent in a direction facing each other in the elastic member 100.

As described above, the first area 1A and the second area 2A may be defined in the elastic member 100. The first area 1A and the second area 2A may be areas defined when the one surfaces 1S are bent in the direction facing each other in the elastic member 100.

In detail, the elastic member 100 is bent in one direction, and the elastic member 100 may be divided into the first area 1A which is a folded area (folding area) and the second area 2A which is an unfolded area (unfolding area).

Referring to FIG. 3 and FIG. 4, the elastic member 100 may include the first area 1A that is an area where the elastic member 100 is bent. The elastic member 100 may include the second area 2A that is not bent and is disposed adjacent to the first area 1A.

For example, the second area 2A may be formed on the left side and the right side of the first area 1A based on the direction in which the elastic member 100 is bent. That is, the second area 2A may be disposed at both ends of the first area 1A. That is, the first area 1A may be disposed between the second areas 2A.

The first area 1A and the second area 2A may be formed on the same elastic member 100. That is, the first area 1A and the second area 2A may be formed integrally with each other without being separated on the same elastic member 100.

Sizes of the first area 1A and the second area 2A may be different from each other. In detail, the size of the second area 2A may be larger than the size of the first area 1A.

In the drawings, it is illustrated that the first area 1A is positioned in a central portion of the elastic member 100, but the embodiment is not limited thereto. That is, the first area 1A may be positioned in one end and an end area of the elastic member 100. That is, the first area 1A may be positioned at one end and the end area of the elastic member 100 such that the size of the second area 2A is asymmetric.

FIG. 4 is a side view of the elastic member for display after the elastic member is folded.

Referring to FIG. 4, the elastic member 100 may be folded in one direction around a folding axis. In detail, the one surface 1S may be folded in a direction facing each other along the folding axis.

As the elastic member 100 is folded in one direction, the first area 1A and the second area 2A may be formed on the elastic member 100. That is, the folding area formed by folding the elastic member 100 in one direction and the unfolding area positioned at both ends of the folding area may be formed in the elastic member 100.

The folding area may be defined as an area where a curvature R is formed, and the unfolded area may be defined as an area where the curvature R is not formed or the curvature is close to zero.

Referring to FIGS. 3 and 4, the elastic member 100 may be folded in one direction to be formed in an order of the unfolding area, the folding area, and the unfolding area.

A plurality of hole or groove may be formed in at least one of the first area 1A and the second area 2A to control and disperse stress generated when the elastic member 100 is folded.

Hereinafter, an elastic member according to various embodiments will be described with reference to the drawings.

Hereinafter, an elastic member according to the first embodiment will be described with reference to FIGS. 5 to 9.

FIGS. 5 and 6 are views showing top views of one surface and the other surface of the elastic member according to the first embodiment. That is, FIG. 5 is a view showing a top view of one surface 1S of the elastic member, which is the inner surface of the folding, when the elastic member 100 is folded. 6 is a view showing a top view of the other surface 2S of the elastic member, which is the outer surface of the folding, when the elastic member 100 is folded.

FIGS. 5 and 6, a plurality of holes penetrating the elastic member 100 may be formed in the elastic member 100.

A pattern may be formed in the first region 1A. A first pattern may be formed in the first region 1A. A hole may be formed in the first region 1A. In detail, a plurality of first holes H1 spaced apart from each other may be formed in the first region 1A. The first hole H1 may be formed through the elastic member 100. In detail, the first hole H1 may be formed through one surface 1S and the other surface 2S of the elastic member 100. FIGS. 5 and 6 illustrate only eight holes formed in each row of the first region 1A, but this is for convenience of description, 9 or more holes may be formed in each row of the first region 1A. In addition, the holes in each row may be formed by being arranged in a zigzag with each other, and this may be equally applied to the following cross-sectional views.

The first hole H1 may be formed through the one surface 1S positioned inside the folding direction and the other surface 2S positioned outside the folding direction.

The plurality of holes formed in the first region 1A serves to distribute stress generated when the first region is folded. In detail, deformation or damage according to stress may occur in the first region 1A of the elastic member due to compressive stress generated when the elastic member 100 is folded.

Accordingly, by forming a hole penetrating the elastic member in the first region 1A, it is possible to prevent stress from being concentrated in a specific region of the first region 1A. Accordingly, it is possible to prevent damage to the elastic member by the compressive stress generated when the elastic member 100 is folded.

The first holes H1 may be formed in a regular pattern in the first region 1A. Alternatively, the first holes H1 may be formed in an irregular pattern in the first region 1A. For example, the first holes H1 may be formed in different shapes, or the first holes H1 may be arranged in a zigzag position between adjacent rows.

The first hole H1 may be formed to have a curved surface. In detail, the first hole H1 may be formed in a shape having a curved surface, such as an elliptical shape, a hemispherical shape, or a circular shape.

However, the embodiment is not limited thereto, and the first hole H1 may be formed in a polygonal shape such as a triangle or a square, and may include both a curved surface and a polygonal shape.

For example, the first hole H1 may be formed in an elliptical shape. In detail, the first hole H1 may be formed in an elliptical shape having a long width lw1 and a short width sw1. For example, the first hole H1 may include a short width sw1 corresponding to the long side direction of the elastic member 100, that is, the longitudinal direction, and a long width lw1 corresponding to the short side direction of the elastic member 100, that is, the width direction.

A ratio (long width/short width) of the long width lw1 to the short width sw1 of the first hole H1 may have a predetermined size. In detail, the ratio (long width/short width) of the long width lw1 to the short width sw1 of the first hole H1 may be 10 or more. In more detail, the ratio (long width/short width) of the long width lw1 to the short width sw1 of the first hole H1 may be 10 to 50.

When the ratio (long width/short width) of the long width lw1 to the short width sw1 of the first hole H1 is less than 10, the buffering role of the first hole H1 may be reduced and the folding characteristic may be reduced. In addition, when the ratio (long/short width) of the long width lw1 to the short width sw1 of the first hole H1 exceeds 50, the size of the elastic member is limited by increasing the size of each first hole. In addition, when the elastic member is folded several times or when the curvature R of the folding area becomes small, the elastic member may be damaged or cracks may be formed in the elastic member. Accordingly, the reliability of the elastic member may be reduced, and the process efficiency of forming the first hole may be reduced.

Meanwhile, the first region 1A and the second region 2A may be divided according to whether or not a hinge part is formed. That is, the folding area and the unfolding area may be divided according to whether or not the hinge part is formed.

In detail, a plurality of hinge parts may be formed in the first region 1A, and no hinge parts may be formed in the second region 2A.

That is, the folding region may be defined as a region in which the hinge part HN is formed.

The hinge part HN may be defined as a point at which folding starts in the elastic member 100. That is, the elastic member may start folding from the hinge parts at both ends of the plurality of hinge parts.

The hinge part HN may include a plurality of hinge parts according to the folding shape of the elastic member 100. The hinge part HN may be formed at both ends of the elastic member 100 overlapping the short direction in which the first hole H1 are formed based on the short direction length of the elastic member 100 in the width direction. In addition, when the first holes of the first region are arranged in a zigzag position, the row of the first holes in which the hinge part HN is formed and the row of the first holes in which the hinge part HN is not formed may be alternately formed.

Accordingly, when the elastic member 100 is folded by the hinge part HN, the folding area can be easily folded.

The hinge part HN may be formed through one surface and the other surface of the short direction area among the end areas of the elastic member 100. That is, the hinge part HN may be defined as a hole in which both end areas in the short direction among the end areas of the elastic member 100 are penetrated.

The shape of the hinge part HN may be the same as or different from the shape and size of the first hole. For example, the hinge part HN may be formed while having a curved surface. In detail, the first hole may be formed in a shape having a curved surface, such as an elliptical shape, a hemispherical shape, or a circular shape. Also, a portion of the first hole H1 may be formed in an open shape.

However, the embodiment is not limited thereto, and the hinge portion may be formed in a polygonal shape such as a triangle or a quadrangle or an oval shape.

A pattern may be formed in the second region 2A. A second pattern may be formed in the second region 2A. A hole may be formed in the second region 2A. In detail, a hole may also be formed in the second area 2A defined as an unfolding area. That is, holes may be formed in the entire area of the elastic member 100.

A plurality of second holes H2 spaced apart from each other may be formed in the second region 2A. The second hole H2 may be formed through the elastic member 100. In detail, the second hole H2 may be formed through one surface 1S and the other surface 2S of the elastic member 100.

That is, the second hole H2 may be formed through the one surface 1S positioned inside the folding direction and the other surface 2S disposed outside the folding direction.

The second hole H2 may serve to reduce a difference in deformation due to heat from the first region 1A in which the first hole H1 is formed.

In detail, by forming holes in both the first region 1A and the second region 2A, the difference between the deformation due to heat in the first region 1A and the deformation due to heat in the second region 1A is reduced. Accordingly, it is possible to prevent the elastic member from being bent or twisted.

In addition, due to the second hole H2 formed in the second region 2A, stress non-uniformity between the first region 1A and the second region 2A may be reduced to prevent bending of the elastic member.

In addition, when the panel is adhered to the elastic member 100 through the adhesive layer, the adhesive material is disposed to fill both the first and second holes. Accordingly, it is possible to prevent the adhesive layer from forming a step with each other in the first and second regions.

The second holes H2 may be formed in a regular pattern in the second region 2A. Alternatively, the second holes H2 may be formed in an irregular pattern in the second region 2A. For example, the second holes H2 may be formed in different shapes, or the second holes H2 may be arranged in a zigzag position between adjacent rows.

The second hole H2 may be formed to have a curved surface. In detail, the second hole H2 may be formed in a shape having a curved surface, such as an elliptical shape, a hemispherical shape, or a circular shape.

However, the embodiment is not limited thereto, and the second hole H2 may be formed in a polygonal shape such as a triangle or a square, or may include a curved surface and a polygonal shape together.

For example, the second hole H2 may be formed in an elliptical shape. In detail, the second hole H2 may be formed in an elliptical shape having a long width lw2 and a short width sw1. For example, the second hole H2 may include a short width sw2 corresponding to the long side direction of the elastic member 100, that is, the longitudinal direction, and a long width lw2 corresponding to the short side direction of the elastic member 100, that is, the width direction.

A ratio (long width/short width) of the long width lw2 to the short width sw2 of the second hole H2 may have a predetermined size. The ratio (long width/short width) of the long width lw2 to the short width sw2 of the second hole H2 may have a predetermined size may be smaller than the ratio (long width/short width) of the long width lw1 to the short width sw1 of the first hole H1.

In detail, the ratio (long width/short width) of the long width lw2 to the short width sw2 of the second hole H2 may be 10 or more. In more detail, the ratio (long width/short width) of the long width lw2 to the short width sw2 of the second hole H2 may be 10 to 50.

Within the above range, the ratio (long width/short width) of the long width lw2 to the short width sw2 of the second hole H2 may have a predetermined size may be smaller than the ratio (long width/short width) of the long width lw1 to the short width sw1 of the first hole H1.

When the ratio (long/short width) of the long width lw2 to the short width sw2 of the second hole H2 is less than 10, the size of the second hole H2 is reduced, and the stress of the first region and the second region may be non-uniform. Thereby, the reliability of the elastic member may be reduced. Also, when the ratio (long width/short width) of the long width lw2 to the short width sw2 of the second hole H2 exceeds 50, the size of the second hole increases. Thereby, the supporting force of the second region may be reduced.

Referring to FIGS. 5 to 7, the first hole H1 and the second hole H2 may be disposed with different areas and/or intervals.

For example, the first holes H1 may be spaced apart from each other at regular intervals, and the second holes H2 may be spaced apart from each other at variable intervals.

Referring to FIG. 7, the first holes H1 may be spaced apart from each other at regular intervals in the first area 1A. FIG. 7 is a view showing a cross-sectional view of the elastic member cut in the folding direction.

For example, a 1a hole H1a closest to the folding axis and a 1b hole H1b may be spaced apart from each other by a 1-1 interval S1-1. Also, the 1c hole H1c adjacent to the 1b hole H1b, that is, the 1c hole H1c closest to the 1b hole H1b may be spaced apart from each other by the 1-2 first interval S1-2.

In this case, the size of the 1-1 interval S1-1 and the 1-2 interval S1-2 may be the same. That is, the first holes H1 may be spaced apart from each other at the same or similar intervals in the first area 1A based on the folding direction.

An interval between the first holes H1 in the first area 1A may be smaller than an interval between the second holes H2 in the second area 2A. In detail, the first holes H1 on the first area 1A are spaced apart from each other by an interval less than the minimum interval among the intervals of the second holes H2 on the second area 2A that are variable.

That is, since the first region 1A is a folding region in which the elastic member 100 is folded, the interval between the holes may be small. In addition, the second region 2A is a region in which the elastic member 100 is unfolded, and in order to secure support and reduce stress non-uniformity, the interval between the holes may be greater than that of the first region.

Accordingly, an area ratio (hole area/total area) of holes to an area in the first region 1A and the second region 2A may be different.

The ratio of the area of the hole to the area in the first region 1A (hole area/total area) may be 50% or more. In detail, the ratio of the area of the hole to the area in the first region 1A (hole area/total area) may be 50% to 55%.

Also, the ratio of the area of the hole to the area in the second region 2A (hole area/total area) may be 50%. In detail, the ratio of the area of the hole to the area in the second region 2A (hole area/total area) may be 15% to 50%.

Accordingly, in the first region 1A, the area of the first hole H1 may be secured, and stress generated according to the folding of the elastic member may be effectively dispersed. In addition, in the second region 2A, the area of the second hole H2 may be secured, thereby reducing the stress non-uniformity between the first and second regions. In addition, it is possible to reduce a step difference that may occur in the adhesive layer while securing the supporting force of the second region.

Meanwhile, in the elastic member 100, the area of the opening OP formed on the one surface or the other surface formed by the second hole H2 may be different for each location in the second region 2A. In detail, in the elastic member 100, the area per unit area of the opening OP may gradually decrease as it moves away from the folding axis of the elastic member 100 in the second region 2A.

To this end, the interval between the second holes H2 may be changed for each position in the second area 2A. For example, the interval between the second holes H2 may increase as the distance from the folding axis (that is, first area 1A) in the second area 2A in the folding direction increases. In detail, the interval between the second holes H2 may be gradually increased while moving away from the folding axis (that is, first region 1A) in the second region 2A. Here, the interval between the second holes H2 may be defined as an interval between the second holes H2 spaced apart from each other in a direction perpendicular to the folding axis.

In detail, the 2a hole H2a closest to the first region 1A and the 2b hole H2b closest to the 2a hole H2a are spaced apart from each other by a 2-1 interval S2-1. Also, the 2b hole H2b and the 2c hole H2c closest to the 2b hole H2b may be spaced apart from each other by a 2-2 interval S2-2. In addition, the 2c hole H2c and the 2d hole H2d closest to the 2c hole H2c may be spaced apart from each other by a 2-3 interval S2-3.

In this case, the sizes of the 2-1 interval S2-1, the 2-2 interval S2-2, and the 2-3 interval S2-3 may be different from each other. In detail, the sizes of the 2-1 interval S2-1, the 2-2 interval S2-2, and the 2-3 interval S2-3 may gradually increase. That is, the second holes H2 on the second area 2A may be arranged such that the interval between the holes gradually increases as the distance from the folding axis (that is, the first area 1A) increases.

For example, the interval between the second holes H2 may gradually increase to 1.3 times to 2 times the interval spaced apart in a direction perpendicular to the folding axis between the first holes H1 as they move away from the first area 1A. For example, when the intervals S1-1 and S1-2 between the first holes H1 are 0.1 mm, the 2-1 interval S2-1 may be formed to be 0.13 mm to 0.2 mm, which is 1.3 times to 2 times the interval S1-1, S1-2 of the first holes H1, the 2-2 interval S2-2 may be formed at an interval of 1.3 to 2 times the 2-1 interval S2-1, the 2-3 interval S2-3 may be formed at an interval of 1.3 to 2 times the 2-2 interval S2-2. For example, the interval between the second holes H2 on the second area 2A is arranged to gradually increase in the range of 0.1 mm to 1.0 mm as the interval from the folding axis (that is, first area 1A) increases. In this case, the size of the interval between the holes may be increased to a uniform size.

As described above, second holes may be disposed in the second region 2A in order to reduce uniform stress with the first region 1A and a step difference between the adhesive layer disposed on the elastic member.

Meanwhile, in order to secure the supporting force of the second area, the second holes need to have a smaller density, ie, an opening area, of the second hole compared to the first area which is a folding area. In this case, when the densities of the first hole and the second hole, that is, when the opening area is arranged differently, the boundary area between the first area and the second area may be visually recognized from the outside due to the difference in the opening area. Alternatively, warpage may occur in a boundary region between the first region and the second region.

Accordingly, the elastic member according to the first embodiment controls the interval between the second holes so that the opening area of the second hole on the second region gradually decreases as the distance from the first region increases. Accordingly, it is possible to reduce a difference between the opening areas of the first hole and the second hole in the boundary region between the first region and the second region. Thereby, it is possible to prevent the difference in the opening area from being visually recognized from the outside. Also, it is possible to reduce warpage that may occur in the boundary region between the first region and the second region.

Accordingly, the elastic member according to the first embodiment may prevent improved folding characteristics, uniformity of stress in the entire area, and step difference of the adhesive layer. In addition, it is possible to prevent a decrease in visibility and warpage of the elastic member in the boundary region between the folding region and the unfolding region.

Meanwhile, FIGS. 8 and 9 are views illustrating cross-sectional views in a direction opposite to that of FIG. 7 described above. That is, FIGS. 8 and 9 are views showing cross-sectional views of the elastic member cut in a direction parallel to the folding axis.

Referring to FIG. 8, a 3-1 interval S3-1 and a 3-2 interval S3-2 of the first hole H1 in a direction parallel to the folding axis on the first area 1A may be the same or similar to each other. In addition, the 3-1 interval S3-1 and the 3-2 interval S3-2 may be different from at least one of the 1-1 interval S1-1 and the 1-2 interval S1-2, which is interval between the first holes H1 in a direction perpendicular to the folding axis.

Referring to FIG. 9, a 4-1 interval S4-1 and a 4-2 interval S4-2 of the second hole H2 in a direction parallel to the folding axis on the second area 2A may be the same or similar to each other. In addition, the 4-1 interval S4-1 and the 4-2 interval S4-2 may be different from at least one of the 2-1 interval S2-1 and the 2-2 interval S2-2, which is interval between the second holes H2 in a direction perpendicular to the folding axis.

That is, since the boundary between the folding area and the unfolding area is not formed in the direction corresponding to the folding axis, the interval between the holes is formed uniformly in the direction, thereby minimizing the occurrence of stress non-uniformity in each area.

Hereinafter, an elastic member according to a second embodiment will be described with reference to FIGS. 10 to 14. In the description of the elastic member according to the second embodiment, descriptions of the same and similar descriptions as those of the substrate for display according to the first embodiment described above will be omitted, and the same reference numerals will be given to the same components.

FIGS. 10 and 11 are views showing top views of one surface and the other surface of the elastic member according to the second embodiment. That is, FIG. 10 is a view showing a top view of one surface 1S of the elastic member, which is the inner surface of the folding, when the elastic member 100 is folded. And, FIG. 11 is a view showing a top view of the other surface 2S of the elastic member, which is the outer surface of the folding, when the elastic member 100 is folded.

FIGS. 10 and 11, a plurality of grooves penetrating the elastic member 100 may be formed in the elastic member 100.

A pattern may be formed in the first region 1A. A first pattern may be formed in the first region 1A. A groove may be formed in the first region 1A. In detail, a plurality of first grooves G1 spaced apart from each other may be formed in the first region 1A. The first groove G1 may be formed through one surface 1S or the other surface 2S of the elastic member 100.

For example, the first groove G1 may be formed to pass through the one surface 1S positioned inside the folding direction, and not to penetrate the other surface 2S.

In addition, the grooves in each row may be formed by being arranged in a zigzag with each other.

The plurality of grooves formed in the first region 1A serves to distribute stress generated when the first region is folded. In detail, the first region 1A of the elastic member may be deformed or damaged due to the compressive stress generated when the elastic member 100 is folded.

Accordingly, by forming a groove partially penetrating the elastic member in the first region 1A, it is possible to prevent stress from being concentrated in a specific region of the first region 1A. Accordingly, it is possible to prevent damage to the elastic member by the compressive stress generated when the elastic member 100 is folded.

The first grooves G1 may be formed in a regular pattern in the first region 1A. Or the first grooves G1 may be formed in an irregular pattern in the first region 1A. For example, the first grooves G1 may be formed in different shapes, or the first grooves G1 may be arranged in a zigzag position between adjacent rows.

The first groove G1 may be formed to have a curved surface. In detail, the first groove G1 may be formed in a shape having a curved surface, such as an elliptical shape, a hemispherical shape, or a circular shape.

However, the embodiment is not limited thereto, and the first groove G1 may be formed in a polygonal shape such as a triangle or a square, and may include both a curved surface and a polygonal shape.

A pattern may be formed in the second region 2A. A second pattern may be formed in the second region 2A. A groove may be formed in the second region 2A. In detail, a groove may be formed in the second area 2A defined as an unfolding area. That is, grooves may be formed in the entire area of the elastic member 100.

A plurality of second grooves G2 spaced apart from each other may be formed in the second region 2A. The second groove G2 may be formed through one surface 1S or the other surface 2S of the elastic member 100.

For example, the second groove G2 may be formed through the one surface 1S positioned inside the folding direction, and not passing through the other surface 2S disposed outside the folding direction.

The second groove G2 may serve to reduce a difference in deformation due to heat from the first region 1A in which the first groove G1 is formed.

In detail, by forming grooves in both the first region 1A and the second region 2A, the difference between the thermal deformation of the first region 1A and the thermal deformation of the second region 1A may be reduced. Accordingly, it is possible to prevent the elastic member from being bent or twisted.

In addition, the second groove G2 formed in the second region 2A may reduce the stress non-uniformity between the first region 1A and the second region 2A to prevent bending of the elastic member.

In addition, when the panel is adhered through the adhesive layer on the elastic member 100 by the second groove G2 formed in the second region 2A, the adhesive material is disposed to fill both the first and second holes. Therefore, it is possible to prevent the adhesive layer from forming a step with each other in the first and second regions.

The second grooves G2 may be formed in a regular pattern in the second region 2A Or the second grooves G2 may be formed in an irregular pattern in the second region 2A. For example, the second grooves G2 may be formed in different shapes, or the second grooves G2 may be arranged in a zigzag position between adjacent rows.

The second groove G2 may be formed to have a curved surface. In detail, the second groove G2 may be formed in a shape having a curved surface, such as an elliptical shape, a hemispherical shape, or a circular shape.

However, the embodiment is not limited thereto, and the second groove G2 may be formed or formed in a polygonal shape such as a triangle or a square, or may include a curved surface and a polygonal shape together.

Referring to FIGS. 10 to 12, the first groove G1 and the second groove G2 may be disposed with different areas and/or intervals.

For example, the first grooves G1 may be spaced apart from each other at regular intervals, and the second grooves G2 may be spaced apart from each other at variable intervals.

Referring to FIG. 12, the first grooves G1 may be spaced apart from each other at regular intervals in the first area 1A. FIG. 12 is a view showing a cross-sectional view of the elastic member cut in the folding direction.

For example, a 1a groove G1a closest to the folding axis and a 1b groove G1b may be spaced apart from each other by a 1-1 interval S'1-1. Also, the 1c groove G1c adjacent to the 1b groove G1b, that is, the 1c groove G1c closest to the 1b groove G1b may be spaced apart from each other by the 1-2 first interval S'1-2.

In this case, the size of the 1-1 interval S'1-1 and the 1-2 interval S'1-2 may be the same. That is, the first grooves G1 may be spaced apart from each other at the same or similar intervals in the first area 1A based on the folding direction.

An interval between the first grooves G1 in the first area 1A may be smaller than an interval between the second grooves G2 in the second area 2A. In detail, the first grooves G1 on the first area 1A are spaced apart from each other by an interval less than the minimum interval among the intervals of the second grooves G2 on the second area 2A that are variable.

That is, since the first region 1A is a folding region in which the elastic member 100 is folded, the interval between the grooves may be small. In addition, the second region 2A is a region in which the elastic member 100 is unfolded, and in order to secure support and reduce stress non-uniformity, the interval between the grooves may be greater than that of the first region.

Accordingly, an area ratio (groove area/total area) of grooves to an area in the first region 1A and the second region 2A may be different.

The ratio of the area of the groove to the area in the first region 1A (groove area/total area) may be 50% or more. In detail, the ratio of the area of the groove to the area in the first region 1A (groove area/total area) may be 50% to 55%.

Also, the ratio of the area of the groove to the area in the second region 2A (groove area/total area) may be 50%. In detail, the ratio of the area of the groove to the area in the second region 2A (groove area/total area) may be 15% to 50%.

Accordingly, in the first region 1A, the area of the first groove G1 may be secured, and stress generated according to the folding of the elastic member may be effectively dispersed. In addition, in the second region 2A, the area of the second groove G2 may be secured, thereby reducing the stress non-uniformity between the first and second regions. In addition, it is possible to reduce a step difference that may occur in the adhesive layer while securing the supporting force of the second region.

Meanwhile, in the elastic member 100, the area of the opening OP formed on the one surface or the other surface formed by the second groove G2 may be different for each location in the second region 2A. In detail, in the elastic member 100, the area per unit area of the opening OP may gradually decrease as it moves away from the folding axis of the elastic member 100 in the second region 2A.

To this end, the interval between the second grooves G2 may be changed for each position in the second area 2A.

For example, the interval between the second grooves G2 may increase as the distance from the folding axis (that is, first area 1A) in the second area 2A in the folding direction increases. In detail, the interval between the second grooves G2 may be gradually increased while moving away from the folding axis (that is, first region 1A) in the second region 2A. Here, the interval between the second grooves G2 may be defined as an interval between the second grooves G2 spaced apart from each other in a direction perpendicular to the folding axis.

In detail, the 2a groove G2a closest to the first region 1A and the 2b groove G2b closest to the 2a groove G2a are spaced apart from each other by a 2-1 interval S'2-1. Also, the 2b groove G2b and the 2c groove G2c closest to the 2b groove G2b may be spaced apart from each other by a 2-2 interval S'2-2. In addition, the 2c groove G2c and the 2d groove G2d closest to the 2c groove G2c may be spaced apart from each other by a 2-3 interval S'2-3.

In this case, the sizes of the 2-1 interval S'2-1, the 2-2 interval S'2-2, and the 2-3 interval S'2-3 may be different from each other. In detail, the sizes of the 2-1 interval S'2-1, the 2-2 interval S'2-2, and the 2-3 interval S'2-3 may gradually increase. That is, the second grooves G2 on the second area 2A may be arranged such that the interval between the grooves gradually increases as the distance from the folding axis (that is, the first area 1A) increases.

For example, the interval between the second grooves G2 may gradually increase to 1.3 times to 2 times the interval spaced apart in a direction perpendicular to the folding axis between the first grooves G1 as they move away from the first area 1A. For example, when the intervals S'1-1 and S'1-2 between the first grooves G1 are 0.1 mm, the 2-1 interval S'2-1 may be formed to be 0.13 mm to 0.2 mm, which is 1.3 times to 2 times the interval S' 1-1, S1-2 of the first grooves G1, the 2-2 interval S'2-2 may be formed at an interval of 1.3 to 2 times the 2-1 interval S'2-1, the 2-3 interval S'2-3 may be formed at an interval of 1.3 to 2 times the 2-2 interval S'2-2.

For example, the interval between the second grooves G2 on the second area 2A is arranged to gradually increase in the range of 0.1 mm to 1.0 mm as the interval from the folding axis (that is, first area 1A) increases. In this case, the size of the interval between the holes may be increased to a uniform size.

As described above, second holes may be disposed in the second region 2A in order to reduce uniform stress with the first region 1A and a step difference between the adhesive layer disposed on the elastic member.

Meanwhile, in order to secure the supporting force of the second area, the second grooves need to have a smaller density, ie, an opening area, of the second groove compared to the first area which is a folding area. In this case, when the densities of the first groove and the second groove, that is, when the opening area is arranged differently, the boundary area between the first area and the second area may be visually recognized from the outside due to the difference in the opening area. Alternatively, warpage may occur in a boundary region between the first region and the second region.

Accordingly, the elastic member according to the second embodiment controls the interval between the second grooves so that the opening area of the second groove on the second region gradually decreases as the distance from the first region increases. Accordingly, it is possible to reduce a difference between the opening areas of the first groove and the second groove in the boundary region between the first region and the second region. Thereby, it is possible to prevent the difference in the opening area from being visually recognized from the outside. Also, it is possible to reduce warpage that may occur in the boundary region between the first region and the second region.

Accordingly, the elastic member according to the second embodiment may prevent improved folding characteristics, uniformity of stress in the entire area, and step difference of the adhesive layer. In addition, it is possible to prevent a decrease in visibility and warpage of the elastic member in the boundary region between the folding region and the unfolding region.

Meanwhile, FIGS. 13 and 14 are views illustrating cross-sectional views in a direction opposite to that of FIG. 12 described above. That is, FIGS. 13 and 14 are views showing cross-sectional views of the elastic member cut in a direction parallel to the folding axis.

Referring to FIG. 13, a 3-1 interval S'3-1 and a 3-2 interval S'3-2 of the first groove G1 in a direction parallel to the folding axis on the first area 1A may be the same or similar to each other. In addition, the 3-1 interval S'3-1 and the 3-2 interval S'3-2 may be different from at least one of the 1-1 interval S'1-1 and the 1-2 interval S'1-2, which is interval between the first grooves G1 in a direction perpendicular to the folding axis.

Referring to FIG. 14, a 4-1 interval S'4-1 and a 4-2 interval S'4-2 of the second groove G2 in a direction parallel to the folding axis on the second area 2A may be the same or similar to each other. In addition, the 4-1 interval S'4-1 and the 4-2 interval S'4-2 may be different from at least one of the 2-1 interval S'2-1 and the 2-2 interval S'2-2, which is interval between the second grooves G2 in a direction perpendicular to the folding axis.

That is, since the boundary between the folding area and the unfolding area is not formed in the direction corresponding to the folding axis, the interval between the grooves is formed uniformly in the direction, thereby minimizing the occurrence of stress non-uniformity in each area.

Hereinafter, an elastic member according to a third embodiment will be described with reference to FIGS. 15 to 19. In the description of the elastic member according to the third embodiment, descriptions of the same and similar descriptions as those of the substrate for display according to the first embodiment described above will be omitted, and the same reference numerals will be given to the same components.

FIGS. 15 and 16, a plurality of holes penetrating the elastic member 100 may be formed in the elastic member 100.

A pattern may be formed in the first region 1A. A first pattern may be formed in the first region 1A. A hole may be formed in the first region 1A. In detail, a plurality of first holes H1 spaced apart from each other may be formed in the first region 1A. The first hole H1 may be formed through the elastic member 100. In detail, the first hole H1 may be formed through one surface 1S and the other surface 2S of the elastic member 100. In addition, the holes in each row may be formed by being arranged in a zigzag with each other, and this may be equally applied to the following cross-sectional views.

The first hole H1 may be formed through the one surface 1S positioned inside the folding direction and the other surface 2S positioned outside the folding direction.

The plurality of holes formed in the first region 1A serves to distribute stress generated when the first region is folded. In detail, deformation or damage according to stress may occur in the first region 1A of the elastic member due to compressive stress generated when the elastic member 100 is folded.

Accordingly, by forming a hole penetrating the elastic member in the first region 1A, it is possible to prevent stress from being concentrated in a specific region of the first region 1A. Accordingly, it is possible to prevent damage to the elastic member by the compressive stress generated when the elastic member 100 is folded.

The first holes H1 may be formed in a regular pattern in the first region 1A. Alternatively, the first holes H1 may be formed in an irregular pattern in the first region 1A.

The first hole H1 may be formed to have a curved surface. In detail, the first hole H1 may be formed in a shape having a curved surface, such as an elliptical shape, a hemispherical shape, or a circular shape. For example, the first holes H1 may be formed in different shapes, or the first holes H1 may be arranged in a zigzag position between adjacent rows.

However, the embodiment is not limited thereto, and the first hole H1 may be formed in a polygonal shape such as a triangle or a square, and may include both a curved surface and a polygonal shape.

A pattern may be formed in the second region 2A. A second pattern may be formed in the second region 2A. A hole may be formed in the second region 2A. In detail, a hole may also be formed in the second area 2A defined as an unfolding area. That is, holes may be formed in the entire area of the elastic member 100.

A plurality of second holes H2 spaced apart from each other may be formed in the second region 2A. The second hole H2 may be formed through the elastic member 100. In detail, the second hole H2 may be formed through one surface 1S and the other surface 2S of the elastic member 100.

That is, the second hole H2 may be formed through the one surface 1S positioned inside the folding direction and the other surface 2S disposed outside the folding direction.

The second hole H2 may serve to reduce a difference in deformation due to heat from the first region 1A in which the first hole H1 is formed.

In detail, by forming holes in both the first region 1A and the second region 2A, the difference between the deformation due to heat in the first region 1A and the deformation due to heat in the second region 1A is reduced. Accordingly, it is possible to prevent the elastic member from being bent or twisted.

In addition, due to the second hole H2 formed in the second region 2A, stress non-uniformity between the first region 1A and the second region 2A may be reduced to prevent bending of the elastic member.

In addition, when the panel is adhered to the elastic member 100 through the adhesive layer, the adhesive material is disposed to fill both the first and second holes. Accordingly, it is possible to prevent the adhesive layer from forming a step with each other in the first and second regions.

The second holes H2 may be formed in a regular pattern in the second region 2A. Alternatively, the second holes H2 may be formed in an irregular pattern in the second region 2A. For example, the second holes H2 may be formed in different shapes, or the second holes H2 may be arranged in a zigzag position between adjacent rows.

The second hole H2 may be formed to have a curved surface. In detail, the second hole H2 may be formed in a shape having a curved surface, such as an elliptical shape, a hemispherical shape, or a circular shape.

However, the embodiment is not limited thereto, and the second hole H2 may be formed in a polygonal shape such as a triangle or a square, or may include a curved surface and a polygonal shape together.

Referring to FIGS. 15 to 17, the first hole H1 and the second hole H2 may be disposed with different areas and/or intervals.

For example, the first holes H1 may have a constant size and may be spaced apart from each other, and the second holes H2 may have a variable size and may be spaced apart from each other.

Referring to FIG. 17, the first holes H1 may be arranged to have a predetermined size in the first area 1A based on the folding direction. FIG. 17 is a view showing a cross-sectional view of the elastic member cut in the folding direction.

For example, a 1a hole H1a closest to the folding axis may have a 1-1 width w1-1, and a 1b hole H1b may have a 1-2 width w1-2

In this case, the size of the 1-1 width w1-1 and the 1-2 width w1-2 may be the same. That is, the first holes H1 may be disposed in the same or similar size in the first area 1A.

A size of the first holes H1 in the first area 1A may be smaller than a size of the second holes H2 in the second area 2A. In detail, the first holes H1 may have a size smaller than or equal to the smallest size among the sizes of the second holes H2 on the second area 2A that are variable.

In addition, an area ratio (hole area/total area) of holes to an area in the first region 1A and the second region 2A may be different.

The ratio of the area of the hole to the area in the first region 1A (hole area/total area) may be 50% or more. In detail, the ratio of the area of the hole to the area in the first region 1A (hole area/total area) may be 50% to 55%.

Also, the ratio of the area of the hole to the area in the second region 2A (hole area/total area) may be 50%. In detail, the ratio of the area of the hole to the area in the second region 2A (hole area/total area) may be 15% to 50%.

Accordingly, in the first region 1A, the area of the first hole H1 may be secured, and stress generated according to the folding of the elastic member may be effectively dispersed. In addition, in the second region 2A, the area of the second hole H2 may be secured, thereby reducing the stress non-uniformity between the first and second regions. In addition, it is possible to reduce a step difference that may occur in the adhesive layer while securing the supporting force of the second region.

Meanwhile, in the elastic member 100, the area of the opening OP formed on the one surface or the other surface formed by the second hole H2 may be different for each location in the second region 2A. In detail, in the elastic member 100, the area per unit area of the opening OP may gradually decrease as it moves away from the folding axis of the elastic member 100 in the second region 2A.

To this end, the size of the second holes H2 may be changed for each position in the second area 2A. In detail, the size of the long width or short width of the opening OP of the second holes H2 may be changed for each position in the second region 2A.

For example, the size of the long width or short width of the opening OP of the second holes H2 may decrease as the distance from the folding axis (that is, first area 1A) in the second area 2A in the folding direction (that is, direction perpendicular to the folding axis) increases. In detail, the size of the long width or short width of the opening OP of the second holes H2 may be gradually decreased while moving away from the folding axis (that is, first region 1A) in the second region 2A. In this case, the second holes H2 may be spaced apart from each other at the same interval.

In detail, a short width of the 2a hole H2a closest to the first region 1A may have a size of a 2-1 width w2-1. And, a short width of the 2b hole H2b closest to the 2a hole H2a may have a size of a 2-2 width w2-2. And, a short width of the 2c hole H2c closest to the 2b hole H2b may have a size of a 2-3 width w2-3. And, a short width of the 2d hole H2d closest to the 2c hole H2c may have a size of a 2-4 width w2-4.

In this case, the sizes of the 2-1 width w2-1, the 2-2 width w2-2, the 2-3 width w2-3, and 2-4 width w2-4 may be different from each other. In detail, the sizes of the 2-1 width w2-1, the 2-2 width w2-2, the 2-3 width w2-3, and 2-4 width w2-4 may gradually decrease. That is, the second holes H2 on the second area 2A may be arranged such that the size of the long width or short width of the opening OP of the second holes H2 gradually decreases as the distance from the folding axis (that is, the first area 1A) increases.

As described above, second holes may be disposed in the second region 2A in order to reduce uniform stress with the first region 1A and a step difference between the adhesive layer disposed on the elastic member.

Meanwhile, in order to secure the supporting force of the second area, the second holes need to have a smaller density of the second hole compared to the first area which is a folding area. In this case, when the densities of the first hole and the second hole is arranged differently, the boundary area between the first area and the second area may be visually recognized from the outside due to the difference in the opening area. Alternatively, warpage may occur in a boundary region between the first region and the second region.

Accordingly, the elastic member according to the third embodiment controls the size of the long width or short width of the opening OP of the second holes so that the opening area of the second hole on the second region gradually decreases (that is, the opening area increases as it approaches the first region.) as the distance from the first region increases. Accordingly, it is possible to reduce a difference between the opening areas of the first hole and the second hole in the boundary region between the first region and the second region. Thereby, it is possible to prevent the difference in the opening area from being visually recognized from the outside. Also, it is possible to reduce warpage that may occur in the boundary region between the first region and the second region.

Accordingly, the elastic member according to the first embodiment may prevent improved folding characteristics, uniformity of stress in the entire area, and step difference of the adhesive layer. In addition, it is possible to prevent a decrease in visibility and warpage of the elastic member in the boundary region between the folding region and the unfolding region.

Meanwhile, FIGS. 18 and 19 are views illustrating cross-sectional views in a direction opposite to that of FIG. 17 described above. That is, FIGS. 18 and 19 are views showing cross-sectional views of the elastic member cut in a direction parallel to the folding axis.

Referring to FIG. 18, the 3-1 width W3-1 and the 3-2 width W3-2 of the first hole H1 in a direction parallel to the folding axis on the first area 1A may be the same or similar to each other.

Referring to FIG. 19, the 4-1 width W4-1 and the 4-2 width W4-2 of the second hole H2 in a direction parallel to the folding axis on the second area 2A may be the same or similar to each other. That is, since the boundary between the folding area and the unfolding area is not formed in the direction corresponding to the folding axis, the interval between the holes is formed uniformly in the direction, thereby minimizing the occurrence of stress non-uniformity in each area.

Hereinafter, an elastic member according to a fourth embodiment will be described with reference to FIGS. 20 to 24. In the description of the elastic member according to the fourth embodiment, descriptions of the same and similar descriptions as those of the substrate for display according to the second embodiment described above will be omitted, and the same reference numerals will be given to the same components.

FIGS. 15 and 16, a plurality of holes penetrating the elastic member 100 may be formed in the elastic member 100.

FIGS. 20 and 21 are views showing top views of one surface and the other surface of the elastic member according to the second embodiment. That is, FIG. 20 is a view showing a top view of one surface 1S of the elastic member, which is the inner surface of the folding, when the elastic member 100 is folded. And, FIG. 21 is a view showing a top view of the other surface 2S of the elastic member, which is the outer surface of the folding, when the elastic member 100 is folded.

FIGS. 20 and 21, a plurality of grooves penetrating the elastic member 100 may be formed in the elastic member 100.

A pattern may be formed in the first region 1A. A first pattern may be formed in the first region 1A. A groove may be formed in the first region 1A. In detail, a plurality of first grooves G1 spaced apart from each other may be formed in the first region 1A. The first groove G1 may be formed through one surface 1S or the other surface 2S of the elastic member 100. In detail, the first groove G1 may be formed through one surface 1S or the other surface 2S of the elastic member 100. In addition, the grooves in each row may be formed by being arranged in a zigzag with each other.

The plurality of grooves formed in the first region 1A serves to distribute stress generated when the first region is folded. In detail, the first region 1A of the elastic member may be deformed or damaged due to the compressive stress generated when the elastic member 100 is folded.

Accordingly, by forming a groove penetrating the elastic member in the first region 1A, it is possible to prevent stress from being concentrated in a specific region of the first region 1A. Accordingly, it is possible to prevent damage to the elastic member by the compressive stress generated when the elastic member 100 is folded.

The first grooves G1 may be formed in a regular pattern in the first region 1A. Or the first grooves G1 may be formed in an irregular pattern in the first region 1A. For example, the first grooves G1 may be formed in different shapes, or the first grooves G1 may be arranged in a zigzag position between adjacent rows. The first groove G1 may be formed to have a curved surface. In detail, the first groove G1 may be formed in a shape having a curved surface, such as an elliptical shape, a hemispherical shape, or a circular shape.

However, the embodiment is not limited thereto, and the first groove G1 may be formed in a polygonal shape such as a triangle or a square, and may include both a curved surface and a polygonal shape.

A pattern may be formed in the second region 2A. A second pattern may be formed in the second region 2A. A groove may be formed in the second region 2A. In detail, a groove may be formed in the second area 2A defined as an unfolding area. That is, grooves may be formed in the entire area of the elastic member 100.

A plurality of second grooves G2 spaced apart from each other may be formed in the second region 2A. The second groove G2 may be formed to partially penetrate the elastic member 100. In detail, the second groove G2 may be formed through one surface 1S or the other surface 2S of the elastic member 100.

The second groove G2 may serve to reduce a difference in deformation due to heat from the first region 1A in which the first groove G1 is formed.

In detail, by forming grooves in both the first region 1A and the second region 2A, the difference between the thermal deformation of the first region 1A and the thermal deformation of the second region 1A may be reduced. Accordingly, it is possible to prevent the elastic member from being bent or twisted.

In addition, the second groove G2 formed in the second region 2A may reduce the stress non-uniformity between the first region 1A and the second region 2A to prevent bending of the elastic member.

In addition, when the panel is adhered through the adhesive layer on the elastic member 100 by the second groove G2 formed in the second region 2A, the adhesive material is disposed to fill both the first and second holes. Therefore, it is possible to prevent the adhesive layer from forming a step with each other in the first and second regions.

The second grooves G2 may be formed in a regular pattern in the second region 2A Or the second grooves G2 may be formed in an irregular pattern in the second region 2A. For example, the second grooves G2 may be formed in different shapes, or the second grooves G2 may be arranged in a zigzag position between adjacent rows.

The second groove G2 may be formed to have a curved surface. In detail, the second groove G2 may be formed in a shape having a curved surface, such as an elliptical shape, a hemispherical shape, or a circular shape.

However, the embodiment is not limited thereto, and the second groove G2 may be formed or formed in a polygonal shape such as a triangle or a square, or may include a curved surface and a polygonal shape together.

Referring to FIGS. 20 to 22, the first groove G1 and the second groove G2 may be disposed with different areas and/or intervals.

For example, the first grooves G1 may have a constant size and may be spaced apart from each other, and the second grooves G2 may have a variable size and may be spaced apart from each other.

Referring to FIG. 22, the first grooves G1 may be arranged to have a predetermined size in the first area 1A based on the folding direction (that is, direction perpendicular to the folding axis). FIG. 22 is a view showing a cross-sectional view of the elastic member cut in the folding direction.

For example, a 1a groove g1a closest to the folding axis may have a 1-1 width w'1-1, and a 1b groove g1b may have a 1-2 width w'1-2

In this case, the size of the 1-1 width w'1-1 and the 1-2 width w'1-2 may be the same. That is, the first grooves G1 may be disposed in the same or similar size in the first area 1A.

A size of the first grooves G1 in the first area 1A may be smaller than a size of the second grooves G2 in the second area 2A. In detail, the first grooves G1 may have a size smaller than or equal to the smallest size among the sizes of the second grooves G2 on the second area 2A that are variable.

In addition, an area ratio (groove area/total area) of grooves to an area in the first region 1A and the second region 2A may be different.

The ratio of the area of the groove to the area in the first region 1A (groove area/total area) may be 50% or more. In detail, the ratio of the area of the groove to the area in the first region 1A (groove area/total area) may be 50% to 55%.

Also, the ratio of the area of the groove to the area in the second region 2A (groove area/total area) may be 50%. In detail, the ratio of the area of the groove to the area in the second region 2A (groove area/total area) may be 15% to 50%.

Accordingly, in the first region 1A, the area of the first groove G1 may be secured, and stress generated according to the folding of the elastic member may be effectively dispersed. In addition, in the second region 2A, the area of the second groove G2 may be secured, thereby reducing the stress non-uniformity between the first and second regions. In addition, it is possible to reduce a step difference that may occur in the adhesive layer while securing the supporting force of the second region.

Meanwhile, in the elastic member 100, the area of the opening OP formed on the one surface or the other surface formed by the second groove G2 may be different for each location in the second region 2A. In detail, in the elastic member 100, the area per unit area of the opening OP may gradually decrease as it moves away from the folding axis of the elastic member 100 in the second region 2A.

To this end, the size of the second grooves G2 may be changed for each position in the second area 2A. In detail, the size of the long width or short width of the opening OP of the second grooves G2 may be changed for each position in the second region 2A.

For example, the size of the long width or short width of the opening OP of the second grooves G2 may decrease as the distance from the folding axis (that is, first area 1A) in the second area 2A in the folding direction (that is, direction perpendicular to the folding axis) increases. In detail, the size of the long width or short width of the opening OP of the second grooves G2 may be gradually decreased while moving away from the folding axis (that is, first region 1A) in the second region 2A. In this case, the second holes H2 may be spaced apart from each other at the same interval.

In detail, a short width of the 2a groove G2a closest to the first region 1A may have a size of a 2-1 width w'2-1. And, a short width of the 2b groove G2b closest to the 2a groove G2a may have a size of a 2-2 width w'2-2. And, a short width of the 2c groove G2c closest to the 2b groove G2b may have a size of a 2-3 width w'2-3. And, a short width of the 2d groove G2d closest to the 2c groove G2c may have a size of a 2-4 width w'2-4.

In this case, the sizes of the 2-1 width w'2-1, the 2-2 width w'2-2, the 2-3 width w'2-3, and 2-4 width w'2-4 may be different from each other. In detail, the sizes of the 2-1 width w'2-1, the 2-2 width w'2-2, the 2-3 width w'2-3, and 2-4 width w'2-4 may gradually decrease. That is, the second grooves G2 on the second area 2A may be arranged such that the size of the long width or short width of the opening OP of the second grooves G2 gradually decreases as the distance from the folding axis (that is, the first area 1A) increases.

As described above, second grooves may be disposed in the second region 2A in order to reduce uniform stress with the first region 1A and a step difference between the adhesive layer disposed on the elastic member.

Meanwhile, in order to secure the supporting force of the second area, the second holes need to have a smaller density of the second hole compared to the first area which is a folding area. In this case, when the density of the second grooves is large, the boundary area between the first area and the second area may be visually recognized from the outside or warpage may occur at the boundary area between the first area and the second area.

Accordingly, the elastic member according to the fourth embodiment controls the size of the long width or short width of the opening OP of the second holes so that the opening area of the second hole on the second region gradually decreases (that is, the opening area increases as it approaches the first region) as the distance from the first region increases. Accordingly, it is possible to reduce a difference between the opening areas of the first hole and the second hole in the boundary region between the first region and the second region. Thereby, it is possible to prevent the difference in the opening area from being visually recognized from the outside. Also, it is possible to reduce warpage that may occur in the boundary region between the first region and the second region.

Accordingly, the elastic member according to the fourth embodiment may prevent improved folding characteristics, uniformity of stress in the entire area, and step difference of the adhesive layer. In addition, it is possible to prevent a decrease in visibility and warpage of the elastic member in the boundary region between the folding region and the unfolding region.

Meanwhile, FIGS. 23 and 24 are views illustrating cross-sectional views in a direction opposite to that of FIG. 22 described above. That is, FIGS. 23 and 24 are views showing cross-sectional views of the elastic member cut in a direction parallel to the folding axis.

Referring to FIG. 23, the 3-1 width W3-1 and the 3-2 width W3-2 of the first hole H1 in a direction parallel to the folding axis on the first area 1A may be the same or similar to each other.

Referring to FIG. 24, the 4-1 width W4-1 and the 4-2 width W4-2 of the second hole H2 in a direction parallel to the folding axis on the second area 2A may be the same or similar to each other.

That is, since the boundary between the folding area and the unfolding area is not formed in the direction corresponding to the folding axis, the interval between the holes is formed uniformly in the direction, thereby minimizing the occurrence of stress non-uniformity in each area.

In the description of the first to fourth embodiments, it has been described that the first pattern and the second pattern having a hole or groove shape are formed in the elastic member, but the embodiment is not limited thereto. While having a change in the interval and size of the first pattern and the second pattern of the above-described embodiments, the first pattern is formed as a hole and the second pattern is formed as a groove, or the first pattern is formed as a groove, and the second pattern is It can be formed alone. That is, the first and second patterns in the shape of holes and grooves may be formed on one elastic member.

Hereinafter, an elastic member according to a fifth embodiment will be described with reference to FIGS. 25 and 26. In the description of the elastic member according to the fifth embodiment, descriptions of the same and similar descriptions as those of the substrate for display according to the embodiments described above will be omitted, and the same reference numerals will be given to the same components.

FIGS. 25 and 26, the elastic member according to the fifth embodiment may change the interval of the first holes H1 for each position in the first region 1A.

For example, referring to FIG. 25, the intervals S1-1 and S1-2 between the first holes H1 increase as the distance from the folding axis in the first area 1A in the folding direction increases. In detail, the interval between the first holes H1 may gradually increase as the distance from the folding axis in the first region 1A increases. Here, an interval between the first holes H1 may be defined as an interval between the first holes H1 spaced apart from each other in a direction perpendicular to the folding axis.

Also, referring to FIG. 26, the interval of the first holes H1 is changed at each location in the first area 1A, and the interval of the second holes H2 is changed at each location in the second area 2A.

That is, the interval S1-1 and S1-2 between the first holes H1 may increase as the distance from the folding axis in the first area 1A in the folding direction increases. In detail, the interval between the first holes H1 may gradually increase as the distance from the folding axis in the first region 1A increases. Here, an interval between the first holes H1 may be defined as an interval between the first holes H1 spaced apart from each other in a direction perpendicular to the folding axis.

In addition, the interval S2-1 and S2-2 between the second holes H2 may increase as the distance from the folding axis (that is, the first area) in the second area 2A increases with respect to the folding direction. In detail, the interval between the second holes H2 may gradually increase as the distance from the folding axis (that is, the first area) in the second region 2A increases. Here, an interval between the second holes H2 may be defined as an interval between the second holes H2 spaced apart from each other in a direction perpendicular to the folding axis.

FIGS. 25 and 26, the description has been focused on the hole formed in the elastic member. However, in the elastic member according to the fifth embodiment, a groove may be formed in at least one of the first region and the second region, and the interval of the grooves may be formed to correspond to the spacing of the holes.

In addition, although it has been described that the interval of the holes or grooves formed in the elastic member is changed in FIGS. 25 and 26, the embodiment is not limited thereto, and the sizes of the holes or grooves may be changed.

For example, as the first holes or first grooves in the first region move away from the folding axis, the long width or short width of the one surface or the other surface of the opening formed by the first hole or first grooves may change. In detail, as the first holes or first grooves in the first region move away from the folding axis, the long width or the short width of the one surface or the other surface of the opening formed by the first hole or the first grooves may decrease.

As described above, second holes may be disposed in the second region 2A to reduce a stress difference from the first region 1A and to reduce a step difference in an adhesive layer disposed on the elastic member.

Meanwhile, in order to secure the supporting force of the second area, the second holes need to have a smaller density, ie, an opening area, of the second hole compared to the first area, which is a folding area. In this case, when the densities of the first hole and the second hole, that is, the opening areas are arranged differently, a boundary area between the first area and the second area may be visually recognized from the outside. Alternatively, warpage may occur in a boundary region between the first region and the second region.

Accordingly, the elastic member according to the fifth embodiment controls the interval between the second hole or the size of the opening area so that the opening area of the second groove on the second region gradually decreases as the distance from the first region increases. Accordingly, it is possible to reduce a difference between the opening areas of the first groove and the second groove in the boundary region between the first region and the second region. Thereby, it is possible to prevent the difference in the opening area from being visually recognized from the outside. Also, it is possible to reduce warpage that may occur in the boundary region between the first region and the second region.

Accordingly, the elastic member according to the fifth embodiment may prevent improved folding characteristics, uniformity of stress in the entire area, and step difference of the adhesive layer. In addition, it is possible to prevent a decrease in visibility and warpage of the elastic member in the boundary region between the folding region and the unfolding region.

FIG. 27 is a view for describing an example in which an elastic member according to embodiments is applied.

Referring to FIG. 27, the elastic member according to the embodiments may be applied to a flexible display device that displays a display.

For example, the elastic member according to the embodiments may be applied to a flexible display device such as a mobile phone or a tablet.

Such the elastic member may be applied to flexible display devices such as a mobile phone, a tablet, and the like that are flexible, bent or folded.

The elastic member is applied to the flexible display devices such as the mobile phone, the tablet, and the like that are flexible, bent or folded and may improve the reliability of the flexible display device by improving the folding reliability in the display device that is repeatedly folded or restored.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. An elastic member foldable based on a folding axis comprising one surface and other surface opposite to the one surface; and a first region including the folding axis and located adjacent to the folding axis and a second region located around the first region and located farther from the folding axis than the first region,
   wherein a plurality of first patterns is formed in the first region, and a plurality of second patterns are formed in the second region,
   wherein the first patterns or the second patterns are formed as holes or grooves,
   wherein the plurality of second patterns extend on the second region in a width direction corresponding to the folding axis, respectively, and are spaced apart from each other in a longitudinal direction perpendicular to the width direction,
   wherein widths of the plurality of second patterns in the width direction change according to a separation distance from the folding axis in the longitudinal direction.

2. The elastic member of claim 1, wherein the widths of the plurality of second patterns in the width direction gradually change according to the separation distance.

3. The elastic member of claim 1, wherein the widths of the plurality of second patterns in the width direction gradually decrease according to the separation distance.

4. The elastic member of claim 2, wherein the plurality of second patterns includes a second-first pattern located closest to the folding axis, and a second-second pattern located farthest from the folding axis, and
   wherein a width of the second-first pattern in the width direction is greater than a width of the second-second pattern in the width direction.

5. The elastic member of claim 4, wherein the width of the second-first pattern in the width direction is a largest among the widths of the plurality of second patterns in the width direction, and
   wherein the width of the second-second pattern in the width direction is a smallest among the widths of the plurality of second patterns in the width direction.

6. The elastic member of claim 4, wherein the plurality of second patterns includes a second-third pattern disposed between the second-first pattern and the second-second pattern along the longitudinal direction, and wherein a width of the second-third pattern in the width direction is smaller than the width of the second-first pattern in the width direction and larger than the length width of the second-second pattern in the width direction.

7. The elastic member of claim 6, wherein widths of the plurality of second patterns in the longitudinal direction are the same as each other.

8. An elastic member foldable based on a folding axis comprising one surface and other surface opposite to the one surface; and a first region including the folding axis and located adjacent to the folding axis and a second region located around the first region and located farther from the folding axis than the first region, wherein a plurality of first patterns is formed in the first region, and a plurality of second patterns are formed in the second region, wherein the first patterns or the second patterns are formed as holes or grooves, wherein the plurality of second patterns extend on the second region in a width direction corresponding to the folding axis, respectively, and are spaced apart from each other in a longitudinal direction perpendicular to the width direction, wherein opening areas on the one surface or the other surface formed by the holes or the grooves of the plurality of second patterns change according to a separation distance.

9. The elastic member of claim 8, wherein the opening areas of the plurality of second patterns gradually change according to the separation distance.

10. The elastic member of claim 8, wherein the opening areas of the plurality of second patterns gradually decrease according to the separation distance.

11. The elastic member of claim 9, wherein the plurality of second patterns includes a second-first pattern located closest to the folding axis, and a second-second pattern located farthest from the folding axis, and wherein an opening area of the second-first pattern is greater than an opening area of the second-second pattern.

12. The elastic member of claim 11, wherein the opening area of the second-first pattern is a largest among the opening area of the plurality of second patterns, and wherein the opening area of the second-second pattern is a smallest among the opening area of the plurality of second patterns.

13. The elastic member of claim 11, wherein the plurality of second patterns includes a second-third pattern disposed between the second-first pattern and the second-second pattern along the longitudinal direction, and wherein an opening area of the second-third pattern is smaller than the opening area of the second-first pattern and larger than the opening area of the second-second pattern.

14. The elastic member of claim 13, wherein opening areas of the plurality of first patterns are the same as each other.

15. The elastic member of claim 1, wherein an area of the first pattern with respect to a total area of the first region is 50% to 60%, wherein an area of the second pattern with respect to a total area of the second region is 10% to 50%.

16. The elastic member of claim 8, wherein an area of the first pattern with respect to a total area of the first region is 50% to 60%, wherein an area of the second pattern with respect to a total area of the second region is 10% to 50%.

17. The elastic member of claim 1, wherein a ratio of a width in the longitudinal direction to a width in the width direction of the first pattern and the second pattern (long width/short width) is 10 or more.

18. The elastic member of claim 8, wherein a ratio of a width in the longitudinal direction to a width in the width direction of the first pattern and the second pattern (long width/short width) is 10 or more.

19. A display device comprising:

the elastic member of claim 1;

a panel disposed on the elastic member, and an adhesive layer disposed between the elastic member and the panel, wherein the panel includes at least one of a display panel and a touch panel.

20. The display device of claim 19, wherein the adhesive layer is disposed while filling the inside of the first pattern and the second pattern.

* * * * *